United States Patent
Sugizaki et al.

(10) Patent No.: US 8,464,004 B2
(45) Date of Patent: Jun. 11, 2013

(54) INFORMATION PROCESSING APPARATUS, MEMORY CONTROL METHOD, AND MEMORY CONTROL DEVICE UTILIZING LOCAL AND GLOBAL SNOOP CONTROL UNITS TO MAINTAIN CACHE COHERENCY

(75) Inventors: Go Sugizaki, Kawasaki (JP); Aiichiro Inoue, Kawasaki (JP); Naozumi Aoki, Kawasaki (JP); Tsuyoshi Motokurumada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 12/330,822

(22) Filed: Dec. 9, 2008

(65) Prior Publication Data
US 2009/0240893 A1 Sep. 24, 2009

(30) Foreign Application Priority Data
Mar. 18, 2008 (JP) .................. 2008-069377

(51) Int. Cl.
G06F 12/08 (2006.01)
G06F 13/00 (2006.01)

(52) U.S. Cl.
USPC .......................................... 711/146

(58) Field of Classification Search
USPC ......................................... 711/146
See application file for complete search history.

(56) References Cited

U.S. PATENT DOCUMENTS

| | | | |
|---|---|---|---|
| 5,522,058 A * | 5/1996 | Iwasa et al. | 711/145 |
| 6,330,643 B1 * | 12/2001 | Arimilli et al. | 711/141 |
| 6,516,391 B1 * | 2/2003 | Tsushima et al. | 711/146 |
| 7,613,884 B2 | 11/2009 | Tokoro | |
| 2005/0240736 A1 * | 10/2005 | Shaw | 711/146 |
| 2006/0047918 A1 | 3/2006 | Sugizaki | 711/146 |
| 2006/0090041 A1 | 4/2006 | Nakagawa | 711/146 |
| 2006/0168404 A1 | 7/2006 | Sagi | 711/146 |
| 2007/0156972 A1 | 7/2007 | Uehara et al. | 711/146 |
| 2008/0320234 A1 * | 12/2008 | Sugizaki | 711/143 |
| 2008/0320238 A1 * | 12/2008 | Sugizaki | 711/146 |

FOREIGN PATENT DOCUMENTS

| | | |
|---|---|---|
| EP | 1 684 181 A2 | 7/2006 |
| JP | 2005-234854 | 9/2005 |
| JP | 2006-72509 | 3/2006 |
| JP | 2006-120029 | 5/2006 |

(Continued)

OTHER PUBLICATIONS

European Search Report mailed Jul. 1, 2009 for corresponding European Application No. 08171592.2.
Korean Patent Office Communication mailed Aug. 30, 2010 in corresponding Korean Patent Application No. 10-2008-0138289.

(Continued)

Primary Examiner — Sanjiv Shah
Assistant Examiner — Glenn Gossage
(74) Attorney, Agent, or Firm — Fujitsu Patent Center

(57) ABSTRACT

An information processing apparatus, a memory control method, and a memory control device are disclosed, the information processing apparatus including nodes each having a main memory, a processor including a cache memory, and a system controller. The system controller of at least one of the nodes includes a holding unit that holds address information corresponding to primary data stored in the main memory of its local node, and not cached in any of the cache memories of other nodes. The system controller of the at least one node may include local and global snoop control units, as well as a virtual tag expansion (VTAGx) unit, to maintain cache coherency, and under certain conditions, a snoop operation may be skipped or omitted.

14 Claims, 14 Drawing Sheets

FOREIGN PATENT DOCUMENTS

| | | |
|---|---|---|
| JP | 2006-202215 | 8/2006 |
| JP | 2007-183702 | 7/2007 |
| KR | 10-2005-0070013 | 7/2005 |
| WO | WO 2004/029812 A2 | 4/2004 |

OTHER PUBLICATIONS

"Japanese Office Action" mailed by JPO and corresponding to Japanese application No. 2008-069377 on Aug. 21, 2012, with English translation.

* cited by examiner

FIG. 11

| SECTION | REQUEST | LOCAL CACHE TAG | VTAGX | | ACCESS TO BE MADE |
|---|---|---|---|---|---|
| 1.1 | COMMAND FETCH | MISS | MISS | × | GLOBAL SNOOP TO BE PERFORMED |
| 1.2 | | | HIT | ◎ | ACCESS TO LOCAL MEMORY TO BE MADE |
| 1.3 | | HIT(SHARED TYPE) | MISS/HIT | ○ | TRANSFER BETWEEN LOCAL CACHES TO BE MADE |
| 1.4 | | HIT(EXCLUSIVE-TYPE) | HIT | ○ | TRANSFER BETWEEN LOCAL CACHES TO BE MADE |
| 2.1 | SHARED-TYPE FETCH (load) | MISS | MISS | × | GLOBAL SNOOP TO BE PERFORMED |
| 2.2 | | | HIT | ◎ | ACCESS TO LOCAL MEMORY TO BE MADE |
| 2.3 | | HIT(SHARED TYPE) | MISS/HIT | ○ | TRANSFER BETWEEN LOCAL CACHES TO BE MADE |
| 2.4 | | HIT(EXCLUSIVE-TYPE) | HIT | ○ | TRANSFER BETWEEN LOCAL CACHES TO BE MADE |
| 3.1 | EXCLUSIVE-TYPE FETCH (store) | MISS | MISS | × | GLOBAL SNOOP TO BE PERFORMED |
| 3.2 | | | HIT | ◎ | ACCESS TO LOCAL MEMORY TO BE MADE |
| 3.3 | | HIT(SHARED TYPE) | MISS | × | GLOBAL SNOOP TO BE PERFORMED |
| 3.4 | | | HIT | ◎ | LOCAL CACHE TO BE INVALIDATED AND DATA TRANSFER TO BE PERFORMED |
| 3.5 | | HIT(EXCLUSIVE-TYPE) | HIT | ○ | TRANSFER BETWEEN LOCAL CACHES TO BE MADE |
| 4.1 | BLOCK STORE | MISS | MISS | × | GLOBAL SNOOP TO BE PERFORMED |
| 4.2 | | | HIT | ◎ | STORE ACCESS TO BE MADE |
| 4.3 | | HIT(SHARED TYPE) | MISS | × | GLOBAL SNOOP TO BE PERFORMED |
| 4.4 | | | HIT | ◎ | LOCAL CACHE TO BE INVALIDATED AND STORE ACCESS TO BE MADE |
| 4.5 | | HIT(EXCLUSIVE-TYPE) | HIT | ○ | LOCAL CACHE TO BE INVALIDATED AND STORE ACCESS TO BE MADE |

INFORMATION PROCESSING APPARATUS, MEMORY CONTROL METHOD, AND MEMORY CONTROL DEVICE UTILIZING LOCAL AND GLOBAL SNOOP CONTROL UNITS TO MAINTAIN CACHE COHERENCY

CROSS-REFERENCE TO RELATED APPLICATION(S)

This application is based upon and claims the benefit of priority of the prior Japanese Application No. 2008-069377, filed on Mar. 18, 2008 in Japan, the entire contents of which are hereby incorporated by reference.

FIELD

The present invention relates to a technique for executing a memory access request issued from a central processing unit (CPU) in an information processing apparatus that includes two or more CPUs each having a cache memory.

BACKGROUND

Generally, a large-scale information processing apparatus that includes CPUs and Input/Output (I/O) devices (a large-scale SMP (Symmetric Multiple Processor) information processing device, for example) has system boards each including CPUs with cache memories, a system controller, and I/O devices, so as to improve the processing capacity.

In such a large-scale information processing apparatus, a control operation is performed to guarantee cache coherency between the system boards (a coherence control operation). Therefore, request broadcasting and snoop result exchanges are performed between the system controllers of the respective system boards (see JP-A 2006-72509 and JP-A 2006-202215, for example).

In a large-scale information processing apparatus, however, the physical distance between the system controllers is longer, as the device size is larger. Where the apparatus structure is expanded, the latency of each memory access becomes longer, and it becomes difficult to improve the performance of the entire information processing apparatus. Also, as a larger number of I/O devices are provided in the information processing apparatus, the number of snoop requests becomes greater accordingly. As a result, it also becomes difficult to secure reasonable throughput of the broadcast bus and each snoop control unit.

By a known technique developed to counter the above problems, the access latency is shortened by skipping the snoop operation over the system boards and performing a data communication between the CPUs in the local system board, when the data at a target address is present in a cache memory in one of the CPUs provided on the same system board.

FIG. 12 is a block diagram illustrating the structure of a conventional large-scale information processing apparatus 100. As illustrated in FIG. 12, the conventional large-scale information processing apparatus 100 includes system boards (nodes) A and B (two system boards in this example). The system board A includes CPUs 10 and 11, I/O devices 20 and 21, and main memories 30 and 31. The system board B includes CPUs 12 and 13, I/O devices 22 and 23, and main memories 32 and 33.

Each of the CPUs 10 to 13 includes multilevel cache memories (two levels in this example). More specifically, the CPU 10 includes a level-1 cache memory 10a and a level-2 cache memory 10b, and the CPU 11 includes a level-1 cache memory 11a and a level-2 cache memory 11b. Likewise, the CPU 12 includes a level-1 cache memory 12a and a level-2 cache memory 12b, and the CPU 13 includes a level-1 cache memory 13a and a level-2 cache memory 13b.

The system board A further includes a system controller 40-1 that performs communication control on the memories (the level-1 cache memories 10a and 11a, the level-2 cache memories 10b and 11b, and the main memories 30 and 31 in this example) provided in the system board A. Likewise, the system board B further includes a system controller 40-2 that performs communication control on the memories (the level-1 cache memories 12a and 13a, the level-2 cache memories 12b and 13b, and the main memories 32 and 33 in this example) provided in the system board B.

With this arrangement, the system controllers 40-1 and 40-2 share the communication control on the memories (the level-1 cache memories 10a to 13a, the level-2 cache memories 10b to 13b, and the main memories 30 to 33 in this example) provided in the information processing apparatus 100. Also, the system controller 40-1 and the system controller 40-2 have the same structure, except that the system controllers 40-1 and 40-2 perform the communication control on different memories. The system controller 40-1 and the system controller 40-2 are connected in such a manner that the system controllers 40-1 and 40-2 can communicate with each other.

The system controller 40-1 includes a cache TAG 46-1, a request transmission/reception unit 41-1, a local snoop control unit 42-1, a broadcast control unit 43-1, a global snoop control unit 44-1, and a memory access issuing unit 45-1.

The cache TAG 46-1 registers and holds specific address information for identifying data (cache data) cached in the cache memories (the level-1 cache memories 10a and 11a, and the level-2 cache memories 10b and 11b in this example) in the local node (the system board A in this example).

The request transmission/reception unit 41-1 receives a memory access request to access a main memory (also referred to herein as a local memory).

More specifically, in a case where a memory access request is generated from the CPU 10, and the data to be retrieved in response to the memory access request is not found in the level-1 cache memory 10a or the level-2 cache memory 10b, the request transmission/reception unit 41-1 receives the memory access request (a read request) from the CPU 10. The request transmission/reception unit 41-1 then transmits the received memory access request to the local snoop control unit 42-1 described below. The request transmission/reception unit 41-1 then receives a global snoop request from the local snoop control unit 42-1 described later, and transmits the global snoop request to the broadcast control unit 43-1 described later. The global snoop request is issued to search all the cache memories (the level-1 cache memories 10a to 13a and the level-2 cache memories 10b to 13b in the example) provided in the information processing apparatus 100 for the data to be accessed in response to the memory access request (hereinafter referred to simply as the target data).

The local snoop control unit 42-1 searches the cache memories in the local node for the target data of the memory access request, and, based on the search result, determines an operation to be performed in response to the memory access request.

More specifically, when receiving the memory access request from the request transmission/reception unit 41-1, the local snoop control unit 42-1 performs an operation in response to the CPUs 10 to 13 that have issued the memory access request, by searching (snooping) the cache TAG 46-1 in the local node for the access target address information (hereinafter referred to simply as the target address information) for identifying the target data of the memory access request.

In a case where there is a hit for the memory access request in the cache TAG 46-1 in the local node as a result of the search, for example, the local snoop control unit 42-1 determines an operation in response to the memory access request, based on the search result. The operation to be performed in response to the memory access request is to issue a read request to read data in a main memory, to issue a purge request to a CPU to purge data in a cache memory, or the like. In a case where there is a miss for the memory access request in the cache TAG 46-1 in the local node as a result of the search, for example, the local snoop control unit 42-1 cancels the local snoop control operation, and transmits a global snoop request to the request transmission/reception unit 41-1.

The broadcast control unit 43-1 transmits and receives global snoop requests to and from the request transmission/reception unit 41-1 of the local node, and also transmits and receives global snoop requests to and from the system controller 40-2 of the other node (the system board B in this example).

More specifically, when receiving a global snoop request from the request transmission/reception unit 41-1, the broadcast control unit 43-1 transmits the global snoop request to the global snoop control unit 44-1 described later, and outputs (broadcasts) the global snoop request to the system controller 40-2 of the other node. When receiving a global snoop request from the system controller 40-2 of the other node, the broadcast control unit 43-1 transmits the global snoop request to the global snoop control unit 44-1.

The global snoop control unit 44-1 searches a cache memory in the local node for the target data, and exchanges search results with the system controller 40-2 in the other node. Based on the search result in the system controller 40-2 in the other node and its own search result, the global snoop control unit 44-1 determines an operation to be performed in response to the memory access request.

More specifically, when receiving a global snoop request from the broadcast control unit 43-1, the global snoop control unit 44-1 searches the cache TAG 46-1 in the local node for the target address information corresponding to the target data of the global snoop request, as an operation in response to the CPU that has issued the memory access request.

Meanwhile, when the global snoop control unit 44-2 of the other node receives a global snoop request from the broadcast control unit 43-1 of the local node via the broadcast control unit 43-2 of the other node, the global snoop control unit 44-2 searches the cache TAG 46-2 in the other node for the target address information corresponding to the target data of the global snoop request. After that, the global snoop control units 44-1 and 44-2 exchange and combine the cache TAG search results (the result of the search on the cache TAG 46-1 conducted by the global snoop control unit 44-1, and the result of the search on the cache TAG 46-2 conducted by the global snoop control unit 44-2), so as to merge the cache statuses. Based on the result of the cache status merging, the global snoop control unit 44-1 of the local node determines an operation to be performed in response to the memory access request.

For example, in a case where it becomes clear as a result of the merging of the cache statuses that the target data of the memory access request issued from the CPU 10a is present in the main memory 30 in the local node, the global snoop control unit 44-1 issues a memory access request to the memory access issuing unit 45-1 in the local node. In a case where it becomes clear as a result of the merging of the cache statuses that the target data of the memory access request issued from the CPU 10a is present in the cache memory 12a in the CPU 12 in the other node, the global snoop control unit 44-1 issues a memory access request to the CPU 12a in the other node.

The memory access issuing unit 45-1 executes a memory access request, based on an operation in response to a memory access request determined by the local snoop control unit 42-1 or the global snoop control unit 44-1.

The cache TAG 46-2, the request transmission/reception unit 41-2, the local snoop control unit 42-2, the broadcast control unit 43-2, the global snoop control unit 44-2, and the memory access issuing unit 45-2 provided in the system controller 40-2 are the same as the cache TAG 46-1, the request transmission/reception unit 41-1, the local snoop control unit 42-1, the broadcast control unit 43-1, the global snoop control unit 44-1, and the memory access issuing unit 45-1 of the system controller 40-1, respectively, except that the communication control operations are to be performed with respect to the level-1 cache memories 12a and 13a, the level-2 cache memories 12b and 13b, and the main memories 32 and 33.

FIGS. 13 and 14 are timing charts for explaining operations of the conventional large-scale information processing apparatus 100.

The following is a description of an operation flow to be performed to access data that is present only in a local (main) memory and is not present in any of the cache memories provided in the conventional large-scale information processing apparatus 100.

As illustrated in FIG. 13, a memory access request (a data fetch request (illustrated as "FCH-REQ" in FIG. 13) in this example; hereinafter referred to as the fetch request) is first issued from the CPU 10 (see t1), and the request transmission/reception unit 41-1 receives the fetch request from the CPU 10 (see t2). The local snoop control unit 42-1 then searches the cache TAG 46-1 in the local node for the target address information of the fetch request (see t3). In FIGS. 13 and 14, the "LPIPE" indicates processing by the local snoop control unit, whereas the "GPIPE" indicates processing by the global snoop control unit.

If the result of the search conducted in response to the memory access request indicates a miss in the cache TAG 46-1 in the local node (indicated as "result=MISS" in FIG. 13), the local snoop control unit 42-1 cancels the local snoop control, and transmits a global snoop request to the request transmission/reception unit 41-1. When receiving the global snoop request from the local snoop control unit 42-1 via the request transmission/reception unit 41-1, the broadcast control unit 43-1 transmits the global snoop request to the global snoop control unit 44-1 (see t4), and broadcasts the global snoop request to the system controller 40-2 of the other node (see t5).

When receiving the global snoop request from the broadcast control unit 43-1, the global snoop control unit 44-1 of the local node searches the cache TAG 46-1 in the local node for the target address information corresponding to the target data of the global snoop request (see t6). Meanwhile, when the global snoop control unit 44-2 of the other node receives the global snoop request from the broadcast control unit 43-1, the global snoop control unit 44-2 searches the cache TAG 46-2 in the other node for the target address information corresponding to the target data of the global snoop request (see t7). The global snoop control units 44-1 and 44-2 of the respective nodes exchange the results of the searches of the cache TAGs 46-1 and 46-2 with each other, and combine the results so as to merge the cache statuses. Based on the result of the cache status merging, the global snoop control unit 44-1 determines the final operation in response to the fetch request (see t8).

If the target data of the fetch request is not detected in any of the cache memories, and the global snoop control unit 44-1 determines that the primary data corresponding to the target data of the fetch request is to be read from the main memory 30 in the local node, the memory access issuing unit 45-1 issues a read request (indicated as "MS-RD-REQ" in FIG. 13) with respect to the fetch request, to the main memory 30 in the local node (see t9). The primary data corresponding to the fetch request is then read from the main memory 30 in the local node into the system controller 40-1 (indicated as "RD" and "MIDQ"; see t10 in FIG. 13). After that, the memory access issuing unit 45-1 transmits the primary data read from the main memory 30 in the local node as a fetch data response (indicated as "FCH-DATA" in FIG. 13) to the CPU 10 (see t11), and the execution of the fetch request is completed (see t12).

Next, an operation flow to be performed to access data cached in a cache memory of the local node in the conventional large-scale information processing apparatus 100 is described.

As illustrated in FIG. 14, a fetch request is first issued from the CPU 10 (see t1), and the request transmission/reception unit 41-1 receives the fetch request from the CPU 10 (see t2). The local snoop control unit 42-1 then searches the cache TAG 46-1 in the local node for the target address information of the fetch request (see t3).

If the result of the search conducted in response to the memory access request indicates a hit in the cache TAG 46-1 in the local node (indicated as "result=HIT" in FIG. 14), the local snoop control unit 42-1 determines the final operation in response to the fetch request, based on the search result (see t4). Accordingly, the local snoop control unit 42-1 omits the global snoop control operation.

If it becomes clear that the target data of the fetch request is present in the level-1 cache memory 11a in the CPU 11 in the local node, and the local snoop control unit 42-1 determines that the cache data corresponding to the target data of the fetch request is to be read from the level-1 cache memory 11a, the local snoop control unit 42-1 issues a read request (indicated as "CPBK-REQ" in FIG. 14) with respect to the fetch request, to the CPU 11 including the level-1 cache memory 11a (see t5). The cache data corresponding to the fetch request is then read from the level-1 cache memory 11a (the CPU 11) into the system controller 40-1 (indicated as "RD" and "MIDQ"; see t6 in FIG. 14). After that, the local snoop control unit 42-1 transmits the cache data read from the level-1 cache memory 11a as a fetch data response (indicated as "FCH-DATA" in FIG. 14) to the CPU 10 (see t7), and the execution of the fetch request is completed (see t8).

As described above, in the conventional large-scale information processing apparatus 100, the global snoop control operation is omitted, and an access is made to a main memory in the local node only in the following cases (1) to (6).

(1) Where the issued memory access request is a command fetch request, and the target data of the command fetch request is found as a shared type (a shared fetch request to simply fetch the target data from one of the cache memories provided in the information processing apparatus 100) in the cache TAG 46-1 in the local node.

(2) Where the issued memory access request is a command fetch request, and the target data of the command fetch request is found as an exclusive type (an exclusive-type fetch command to cause only one cache memory to store the target data among all the cache memories provided in the information processing apparatus 100) in the cache TAG 46-1 in the local node.

(3) Where the issued memory access request is a shared-type (load) fetch request, and the target data of the shared-type fetch request is found as a shared type in the cache TAG 46-1 in the local node.

(4) Where the issued memory access request is a shared-type fetch request, and the target data of the shared-type fetch request is found as an exclusive type in the cache TAG 46-1 in the local node.

(5) Where the issued memory access request is an exclusive-type (store) fetch request, and the target data of the exclusive-type fetch request is found as an exclusive type in the cache TAG 46-1 in the local node.

(6) Where the issued memory access request is a block store request, and the target data of the block store request is found as an exclusive type in the cache TAG 46-1 in the local node.

As described above, by the conventional technique, only when the target data of a memory access request is found in a local cache memory, the global snoop control operation over the system boards in the information processing apparatus 100 can be skipped, and a data transfer between the CPUs in the local node can be initiated.

However, only the total capacity of the cache memories provided in the local node is available in the above conventional technique.

Also, in a case where there is a miss in all the cache memories in the local node, the location of the latest data corresponding to the target data cannot be detected. Therefore, in such a case, it is necessary to perform the global snoop control operation over the system boards.

As a result, the access start success rate is not sufficiently high when the global snoop operation is skipped, and the performance of the apparatus might not be improved as desired.

SUMMARY

The disclosed information processing apparatus includes two or more nodes each having main memories, processors including cache memories, and a system controller that performs a control operation to guarantee cache coherency among the nodes. The system controller includes a holding unit that holds address information corresponding to primary data that is present in the main memory in a local node, and not cached in any of the cache memories of any of the nodes other than the local node.

The disclosed memory control method for an information processing apparatus that includes two or more nodes each having main memories, processors including cache memories, and a system controller that performs a control operation to guarantee cache coherency among the nodes includes: receiving a memory access request generated at the local node that is one of the nodes; accessing a holding unit when the memory access request is received in the receiving, the holding unit holding the address information corresponding to primary data present in the main memories of the local node, and not being cached in any of the cache memories of the other nodes; and performing a local snoop control operation to guarantee cache coherency at the local node, when the target data of the memory access request received in the receiving corresponds to the address information held by the holding unit.

The disclosed memory control device includes: main memories, processors having cache memories, and a system controller that performs a control operation to guarantee cache coherency between the memory control device and other memory control devices. The system controller includes a holding unit that holds the address information corresponding to primary data that is present in the main memory of the memory control device, and not cached in any of the cache memories of the other memory control devices.

The object and advantages of the invention will be realized and attained by means of the elements and combinations particularly pointed out in the appended claims.

It is to be understood that both the foregoing general description and the following detailed description are exemplary and explanatory and are not restrictive of the embodiment, as claimed.

BRIEF DESCRIPTION OF THE DRAWINGS

FIG. 11 is a relations table for explaining the conditions under which a global snoop control operation is canceled in the information processing apparatus as an embodiment of the present invention;

DESCRIPTION OF EMBODIMENT(S)

The following is a description of embodiments of the present invention, with reference to the accompanying drawings.

[1] One Embodiment of the Invention

Figure 1:
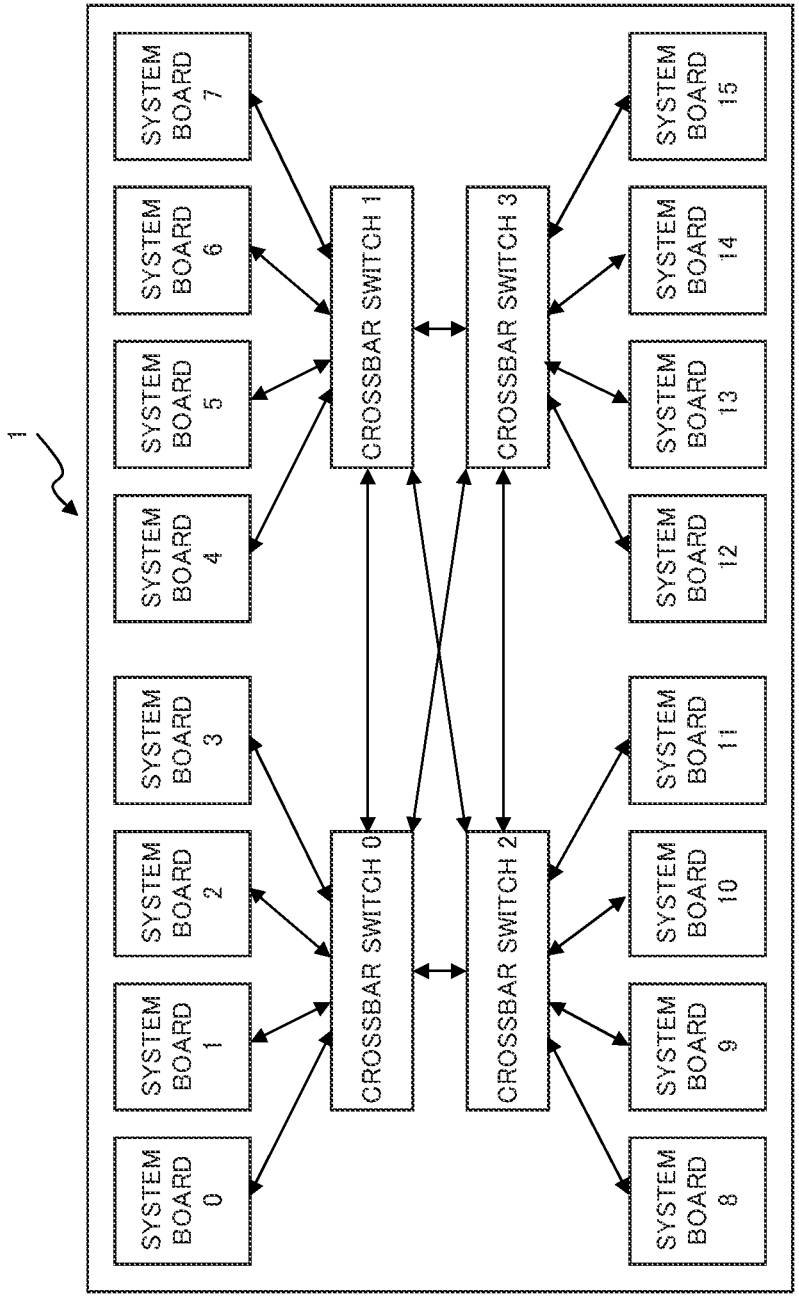
FIG. 1 is a block diagram illustrating the entire structure of an information processing apparatus as an embodiment of the present invention.

FIG. 1 is a block diagram illustrating the entire structure of an information processing apparatus as an embodiment of the present invention.

The information processing apparatus 1 as an embodiment of the present invention is a large-scale SMP information processing apparatus. As illustrated in FIG. 1, this information processing apparatus 1 includes crossbar switches XB0 to XB3 (four crossbar switches in the example illustrated in FIG. 1) and system boards (nodes or memory control devices) SB0 to SB 15 (sixteen system boards in the example illustrated in FIG. 1). The crossbar switches XB0 to XB3 are connected to the system boards SB0 to SB15, so that the connections in the entire system are controlled.

The system boards SB0 to SB15 are separated from one another by partitions formed with physical boundaries (physical spaces) such as housings, boards, and chips. Accordingly, each one system board serves as one node that is an expansion unit of processing capacity in the information processing apparatus 1.

The information processing apparatus as an embodiment of the present invention and a local snoop control method are now described in detail, by way of example, using the system boards SB0 and SB1.

Figure 2:
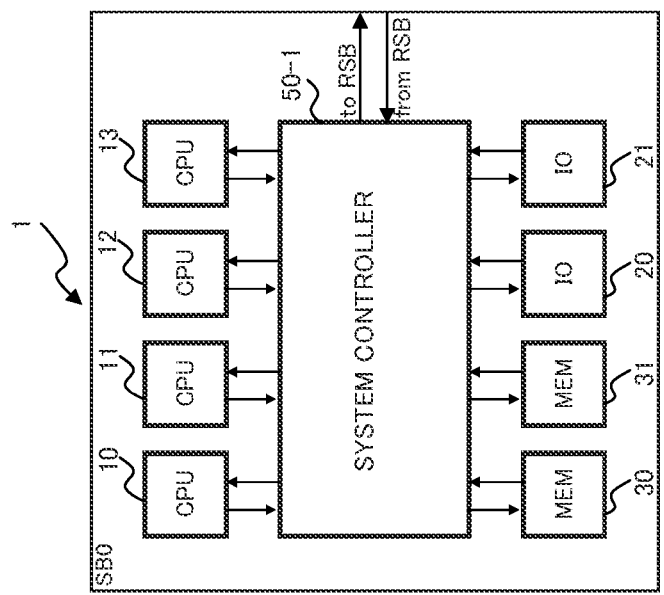
FIG. 2 is a block diagram illustrating the structure of a system board in the information processing apparatus as an embodiment of the present invention.
Figure 3:
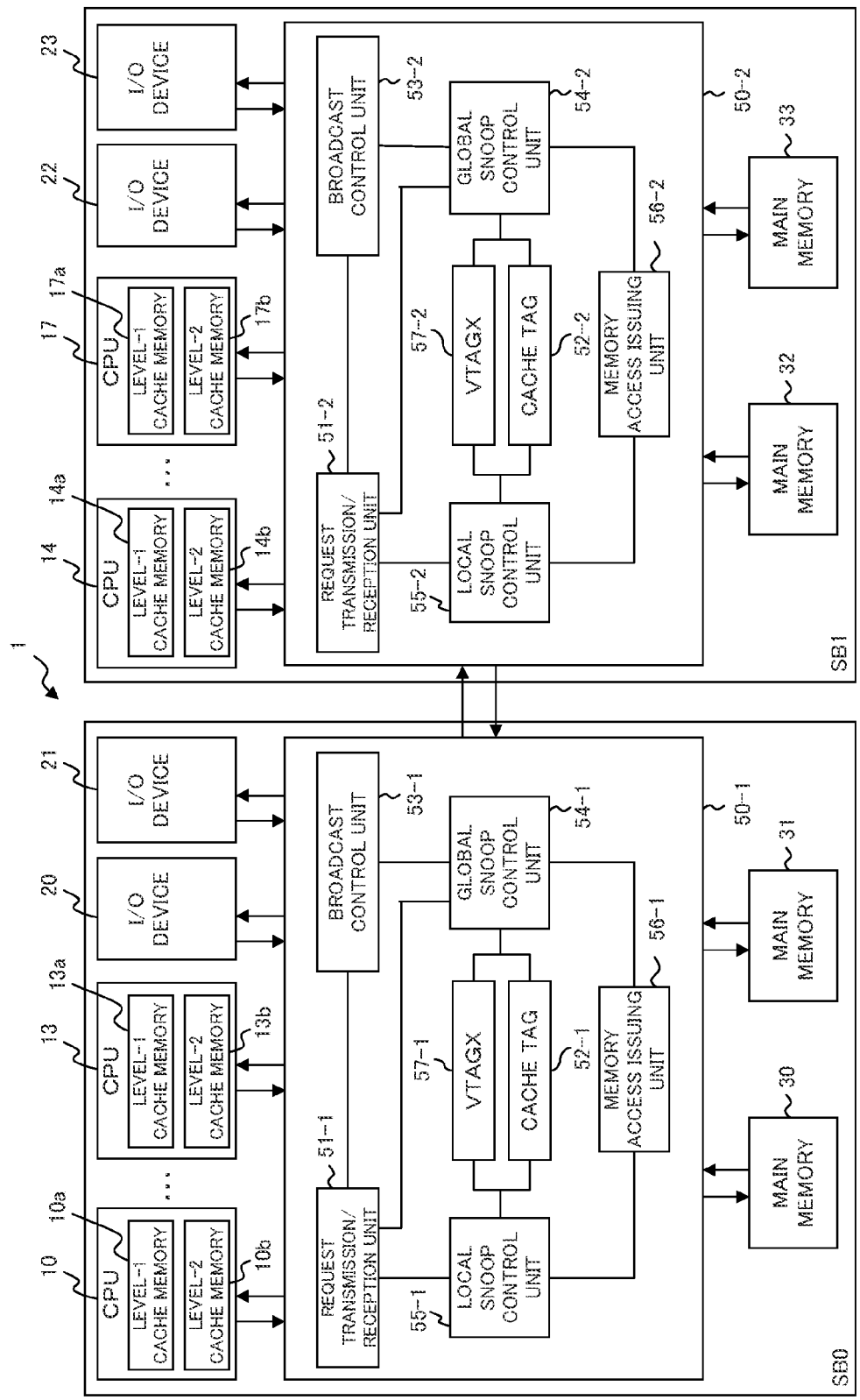
FIG. 3 is a block diagram illustrating the structures of system boards in the information processing apparatus as an embodiment of the present invention.
Figure 4:
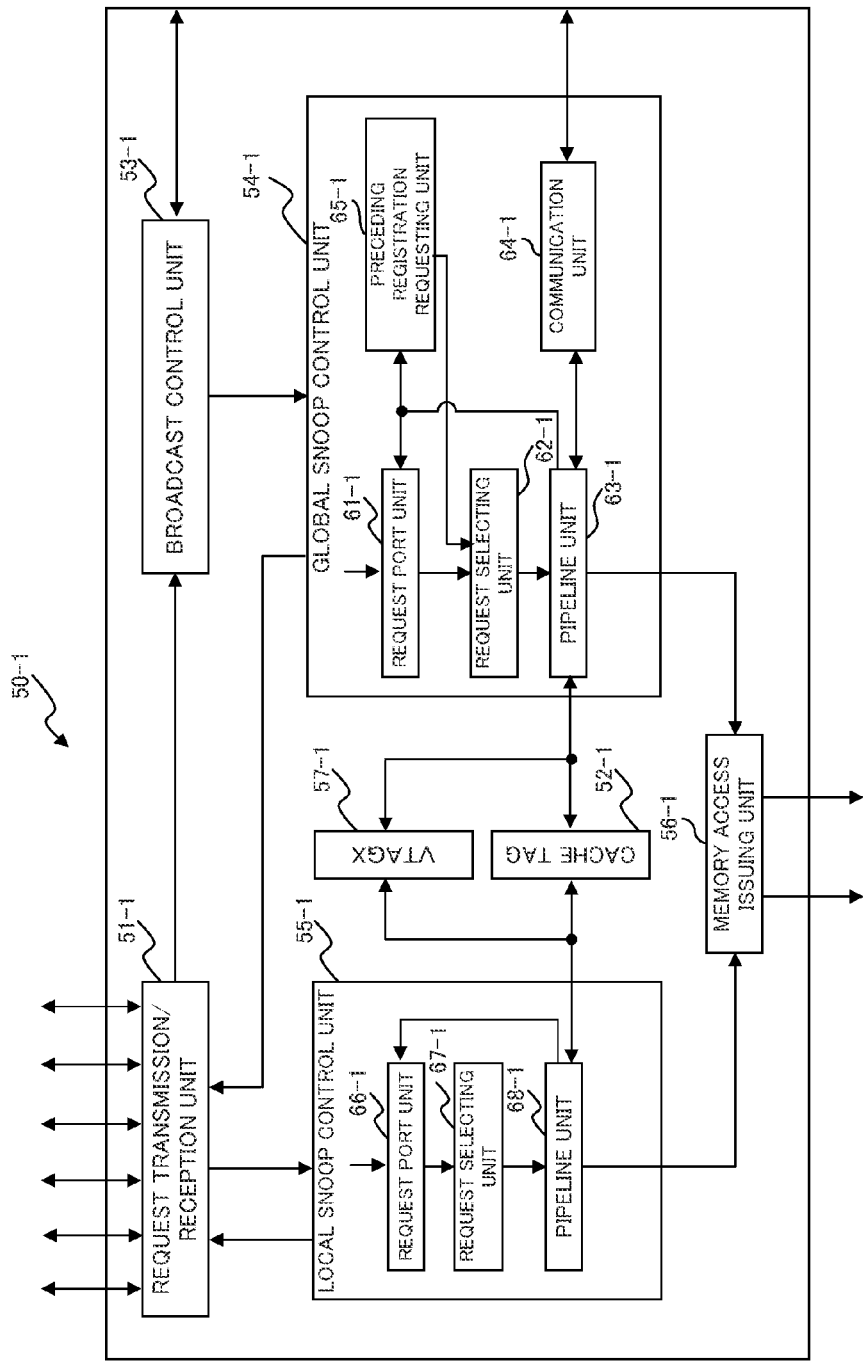
FIG. 4 is a block diagram illustrating the structure of a system controller in the information processing apparatus as an embodiment of the present invention.

FIG. 2 is a block diagram illustrating the structure of a system board in the information processing apparatus as an embodiment of the present invention. FIG. 3 is a block diagram illustrating the structure of the system board in greater detail. FIG. 4 is a block diagram illustrating the structure of the system controller.

As illustrated in FIGS. 2 and 3, the system board SB0 includes CPUs (processors) 10 to 13 (four in this example), I/O devices (input/output devices) 20 and 21 (two in this example), main memories 30 and 31 (two in this example), and a system controller 50-1, for example. As illustrated in FIG. 3, the system board SB1 includes CPUs 14 to 17 (four in this example), I/O devices 22 and 23 (two in this example), main memories 32 and 33 (two in this example), and a system controller 50-2.

Each of the CPUs 10 to 17 includes multilevel cache memories (two levels in this example). More specifically, the CPU 10 includes a level-1 cache memory (a cache memory) 10a and a level-2 cache memory (a cache memory) 10b, the CPU 11 includes a level-1 cache memory 11a and a level-2 cache memory 11b, the CPU 12 includes a level-1 cache memory 12a and a level-2 cache memory 12b, and the CPU 13 includes a level-1 cache memory 13a and a level-2 cache memory 13b. Likewise, the CPU 14 includes a level-1 cache memory 14a and a level-2 cache memory 14b, the CPU 15 includes a level-1 cache memory 15a and a level-2 cache memory 15b, the CPU 16 includes a level-1 cache memory 16a and a level-2 cache memory 16b, and the CPU 17 includes a level-1 cache memory 17a and a level-2 cache memory 17b.

In the following description, the data stored (or present) in the cache memories will be referred to as cache data. The cache data is a duplicate of primary data stored (or present) in the main memories.

The system controllers 50-1 and 50-2 perform control operations to guarantee cache coherency among all the system boards SB0 to SB15 provided in the information processing apparatus 1.

Although the system boards provided in the information processing apparatus 1 include the system boards SB0 to SB15 (see FIG. 1), only the system boards SB0 and SB1 illustrated in FIG. 3 will be explained below for convenience.

The system controllers 50-1 and 50-2 are connected to each other via a bus, so that the system controllers 50-1 and 50-2 can communicate with each other. The system controllers 50-1 and 50-2 share communication control operations for the memories provided in the information processing apparatus 1 (in this example, the level-1 cache memories 10a to 17a, the level-2 cache memories 10b to 17b, and the main memories 30 to 33). The system controller 50-1 and the system controller 50-2 have the same structure, except that the system controllers 50-1 and 50-2 perform communication control operations on different memories from each other. More specifically, the system controller 50-1 performs communication control operations on the CPUs 10 to 13, the I/O devices 20 and 21, and the main memories 30 and 31. The system controller 50-2 performs communication control operations on the CPUs 14 to 17, the I/O devices 22 and 23, and the main memories 32 and 33.

The system controllers 50-1 and 50-2 each have a mechanism to perform a control operation to guarantee cache coherency beyond the boundaries between the system boards SB0 to SB15 provided in the information processing apparatus 1 (a coherence control operation). The cache coherency is the consistency of data to be maintained, so that the latest correct cache data can be accessed even when a data update is performed for each set of cache data present in cache memories corresponding to the same primary data.

The system controller 50-1 includes a cache TAG (the first holding unit) 52-1, a virtual TAG expansion (VTAGX; the holding unit or the second holding unit) 57-1, a request transmission/reception unit 51-1, a broadcast control unit 53-1, a global snoop control unit 54-1, a local snoop control unit 55-1, and a memory access issuing unit 56-1.

The cache TAG 52-1 registers and holds (stores) the address information (the specific information) for identifying data (cache data) cached in the cache memories (the level-1 cache memories 10a to 13a and the level-2 cache memories 10b to 13b in this example) in the local node (the local system board, or the system board SB0 in this example). The operation of the cache TAG 52-1 is known in the art, and therefore, explanation of it is omitted here.

The VTAGX 57-1 registers and holds the address information (the specific information) for identifying primary data that is present in the main memories (the local memories) 30 and 31 in the local node, with the cache data corresponding to the primary data not present in the cache memories (the level-1 cache memories 14a to 17a and the level-2 cache memories 14b to 17b in the example illustrated in FIG. 3) of all the nodes (the system boards SB1 to SB15 in FIG. 1; the other system board SB1 in the example illustrated in FIG. 3) other than the local node in the information processing apparatus 1. Accordingly, the VTAGX 57-1 virtually expands the local cache memory space.

The VTAGX 57-1 registers the address information of such data size that can be read by a CPU in one operation, and is managed for each line size of the cache memories. The VTAGX 57-1 also stores a valid bit (the state information) indicating whether the address information is in a valid state or in an invalid state in association with the address information. Where the valid bit indicates a valid state, the address information registered in the VTAGX 57-1 can be detected through snooping by the local snoop control unit 55-1 and the global snoop control unit 54-1 described later. Where the valid bit indicates an invalid state, the address information registered in the VTAGX 57-1 cannot be detected through snooping by the local snoop control unit 55-1 and the global snoop control unit 54-1 described later.

The VTAGX 57-1 may also store a series of address information forming successive sets of address information in the address space. By simultaneously managing the addresses of successive lines at the VTAGX 57-1, the space efficiency of the random access memory (RAM) can be increased. In this case, valid bits associated with the sets of address information in the address information series are registered independently of one another in the VTAGX 57-1.

The request transmission/reception unit 51-1 receives a memory access request issued from the CPUs 10 to 17 or the I/O devices 20 to 23, and a global snoop request to perform a global snoop control operation. Through the global snoop control operation, an operation to be performed in response to a memory access request is determined by performing a control operation over the nodes to guarantee cache coherency between all the nodes (the system boards SB0 to SB15 in FIG. 1; the system boards SB0 and SB1 in FIG. 3) in the information processing apparatus 1. A global snoop request is an instruction to search the cache memories (the level-1 cache memories 10a to 17a and the level-2 cache memories 10b to 17b in the example illustrated in FIG. 3) of all the nodes provided in the information processing apparatus 1 for the data to be accessed in response to a memory access request (hereinafter referred to simply as the target data).

When receiving a memory access request, the request transmission/reception unit 51-1 transmits the memory access request to the local snoop control unit 55-1 described later. When receiving a global snoop request for the global snoop control from the local snoop control unit 55-1, the request transmission/reception unit 51-1 transmits the global snoop request to the global snoop control unit 54-1 described later.

More specifically, in a case where a memory access request is issued from the CPU 10, and a cache miss with respect to the data to be accessed in response to the memory access request occurs in the level-1 cache memory 10a or the level-2 cache memory 10b, the request transmission/reception unit 51-1 receives the memory access request (the read request) issued from the CPU 10. The request transmission/reception unit 51-1 then transmits the memory access request to the local snoop control unit 55-1 described later. When receiving a global snoop request from the local snoop control unit 55-1 after that, the request transmission/reception unit 51-1 transmits the global snoop request to the broadcast control unit 53-1 described later.

The local snoop control unit 55-1 performs the local snoop control operation (the local snooping) in a case where a memory access request is issued from its local node, and the target data of the memory access request corresponds to the address information stored in the cache TAG 52-1 or the VTAGX 57-1 in the local node. Through the local snoop control operation, an operation to be performed in response to the memory access request is determined by performing a control operation to guarantee cache coherency in the local node. Accordingly, in the above case, the local snoop control unit 55-1 performs a control operation to guarantee cache coherency only within a closed range in the local system board of the local node. In this manner, the local snoop control unit 55-1 guarantees cache coherency between all the nodes provided in the information processing apparatus 1.

If the target data of the memory access request does not correspond to any of the address information stored in the cache TAG 52-1 or the VTAGX 57-1 in the local node, the local snoop control unit 55-1 transmits a global snoop request to the request transmission/reception unit 51-1.

As illustrated in FIG. 4, the local snoop control unit 55-1 includes a request port unit 66-1, a request selecting unit 67-1, and a pipeline unit 68-1, for example.

The request port unit 66-1 sequentially stores (holds) requests received from the request transmission/reception unit 51-1.

The request selecting unit 67-1 selects a request from the requests stored in the request port unit 66-1.

The pipeline unit 68-1 of the local snoop control unit performs a local snoop control operation on the target data of the request selected by the request selecting unit 67-1.

More specifically, when receiving a memory access request from the request transmission/reception unit 51-1, the pipeline unit 68-1 searches (snoops) the cache TAG 52-1 and the VTAGX 57-1 in the local node for the address information to be accessed (hereinafter referred to simply as the target address information) for identifying the target data of the memory access request in response to the CPU that has issued the memory access request.

If there is a hit in the cache TAG 52-1 or the VTAGX 57-1 in the local node as a result of the search in response to the memory access request, the pipeline unit 68-1 determines an operation to be performed in response to the memory access request, based on the search result. In this case, the pipeline unit 68-1 indicates that the latest cache data corresponding to the target data is present in the cache memory or the main memory in the local node. By doing so, the pipeline unit 68-1 guarantees that the cache data in the cache memory in the local node has not been updated. The operation to be performed in response to the memory access request is to issue a request to read the data in the main memory or a request for the CPU to purge the data in the cache memory.

If there is a miss in both the cache TAG 52-1 and the VTAGX 57-1 in the local node as a result of the search, the pipeline unit 68-1 cancels the local snoop control operation, and transmits a global snoop request to the request transmission/reception unit 51-1.

The broadcast control unit 53-1 transmits and receives global snoop requests to and from the request transmission/reception unit 51-1 of the local node, and also transmits and receives global snoop requests to and from the system controllers of all the nodes (the system controller 50-2 in the other node SB1 in this example) other than the local node in the information processing unit 1.

More specifically, when receiving a global snoop request from the request transmission/reception unit 51-1, the broadcast control unit 53-1 transmits the global snoop request to the global snoop control unit 54-1 described later, and broadcasts the global snoop request to the system controller 50-2 as the other node. In this manner, the broadcast control unit 53-1 broadcasts only the memory access requests that are determined to be impossible for the local snoop control unit 55-1 to handle.

When receiving a global snoop request from the system controller 50-2 as the other node, the broadcast control unit 53-1 transmits the global snoop request to the global snoop control unit 54-1.

The global snoop control unit 54-1 performs a global snoop control operation. As illustrated in FIG. 4, the global snoop control unit 54-1 includes a request port unit 61-1, a request selecting unit 62-1, a pipeline unit 63-1, a communication unit 64-1, and a preceding registration requesting unit 65-1, for example.

The request port unit 61-1 sequentially stores (holds) global snoop requests received from the broadcast control unit 53-1.

The request selecting unit 62-1 selects a global snoop request from the global snoop requests stored in the request port unit 61-1.

The pipeline unit 63-1 of the global snoop control unit performs a global snoop control operation on the target data of the global snoop request selected by the request selecting unit 62-1.

The pipeline unit 63-1 detects the target data of the global snoop request from the cache memory in the local node, and exchanges the search results with the system controller 50-2 of the other node. In this manner, the pipeline unit 63-1 determines an operation to be performed in response to the memory access request, based on the combined result of the search result of the system controller 50-2 of the other node and its own search result.

More specifically, in response to the CPU that has issued the memory access request, the pipeline unit 63-1 searches the cache TAG 52-1 in the local node for the target address information corresponding to the target data of the global snoop request selected by the request selecting unit 62-1.

When the global snoop control unit 54-2 (or the pipeline unit therein: not illustrated) of the other node receives a global snoop request from the broadcast control unit 53-1 of the local node via the broadcast control unit 53-2 of the other node, the global snoop control unit 54-2 searches the cache TAG 52-2 in the other node for the target address information corresponding to the target data of the global snoop request. After that, the pipeline unit 63-1 and the global snoop control unit 54-2 of the respective nodes transmit, receive, via the communication unit 64-1 which is to be described later, and combine the cache TAG search results (the result of the search of the cache TAG 52-1 from the pipeline unit 63-1, and the result of the search of the cache TAG 52-2 from the global snoop control unit 54-2 in this example), so as to merge the cache statuses. Based on the result of the merging of the cache statuses, the pipeline unit 63-1 determines an operation to be performed in response to the memory access request.

In a case where it becomes clear as a result of the merging of the cache statuses that the target data of the memory access request issued from the CPU 10*a* is not present in any of the cache memories provided in the information processing apparatus 1, and the main memory 30 in the local node is to be accessed, the pipeline unit 63-1 issues a memory access request to the memory access issuing unit 56-1 in the local node. In a case where it becomes clear as a result of the merging of the cache statuses that the target data of the memory access request issued from the CPU 10*a* is present in the cache memory 14*a* in the CPU 14 in the other node, the pipeline unit 63-1 issues a memory access request to the CPU 14*a* in the other node.

Accordingly, when receiving a global snoop request from the broadcast control unit 53-1, the pipeline unit 63-1 searches the cache TAG 52-1 in the local node and the cache TAG 52-2 in the other node for the target address information corresponding to the target data of the global snoop request. The pipeline unit 63-1 then notifies the entire information processing apparatus 1 that the CPU is to access the main memories 30 and 31 in the local node, and receives a response. In this manner, the pipeline unit 63-1 performs the control operation to guarantee cache coherency in the entire information processing apparatus 1.

The pipeline unit 63-1 also functions as a registration unit and an invalidation unit, as well as the above described unit.

In a case where it becomes clear as a result of the global snoop control operation that the cache data corresponding to the primary data present in the main memories 30 and 31 of the local node is not present in any cache memory of any node in the information processing apparatus 1, the pipeline unit (hereinafter referred to as the registration unit) 63-1 registers the address information identifying the primary data in the VTAGX 57-1, and causes the VTAGX 57-1 to hold the address information. The registration (pipeline) unit 63-1 notifies the entire information processing apparatus 1 that the CPU is to access a memory, and receives a response. If it becomes clear from the response that the cache data corresponding to the target data is not registered in any of the cache memories provided in the information processing apparatus 1, the registration unit 63-1 registers the address information identifying the primary data corresponding to the target data in the VTAGX 57-1 in the local node. Accordingly, when a memory access request issued from the CPUs (local CPUs) 10 to 13 in the local node is directed to the main memories 30 and 31 in the local node, and an access to the main memories 30 and 31 in the local node is to be made as a result of a global snoop operation (a miss), the registration unit 63-1 registers the corresponding address information in the VTAGX 57-1 in the local node.

In this embodiment, using the set associative method, the registration unit 63-1 selects a new registration entry and registers address information in accordance with the Least Recently Used (LRU) policy between WAYs if there is not an entry space at the time of new entry registration. Even if there is the same valid entry as the address information to be registered, the registration unit 63-1 does not perform any processing for the address information present in the valid entry, and replaces the valid entry with the address information to be registered.

When functioning as an invalidation unit, the pipeline unit (hereinafter referred to as the invalidation unit) 63-1 invalidates the address information corresponding to primary data present in the main memories 30 and 31 of the local node and is stored in the VTAGX 57-1 in the local node, when an operation as a response to a memory access request is determined in a case where the memory access request is issued at one of the nodes (the system board SB1 in this example) other than the local node in the information processing apparatus 1, and the target data of the memory access request is the primary data that is present in the main memories 30 and 31 of the local node and corresponds to the address information stored in the VTAGX 57-1 in the local node.

More specifically, when the entire information processing apparatus 1 is notified of an access request for the CPUs 14 to 17 in the other node to access the main memories 30 and 31 in the local node, the invalidation (pipeline) unit 63-1 checks the target address information of this access request against the address information stored in the VTAGX 57-1 in the local node. If the address information matching the target address information is stored in the VTAGX 57-1 in the local node, the invalidation unit 63-1 changes the state of the valid bit corresponding to the address information from a valid state into an invalid state, so as to guarantee cache coherency in the entire information processing apparatus 1. Accordingly, when an access is determined to be made in a case where the access destination of a memory access request from the CPUs 14 to 17 (the remote CPUs) in the other node is the data having its address registered in the VTAGX 57-1 in the local node, the invalidation unit 63-1 invalidates the corresponding entry in the VTAGX 57-1 in the local node.

The communication unit 64-1 performs communications with the pipeline unit 63-1 and the global snoop control units (the global snoop control unit 54-2 of the other node in this example) of all the nodes other than the local node in the information processing apparatus 1.

The preceding registration requesting unit (the extended specific information generating unit) 65-1 generates preceding address information (the extended specific information) that is address information different from the address information stored in the VTAGX 57-1.

The preceding registration requesting unit 65-1 is provided for the following reasons.

In a case where the registration unit 63-1 registers the corresponding address information in the VTAGX 57-1 only when a fetch request from the CPU (the local CPU) in the local node is executed, the target data corresponding to the address information is purged from the cache memory after the registration. When the CPU in the local node again accesses the target data corresponding to the address information, there is a hit in the VTAGX 57-1 for the first time. Accordingly, only when an access is made for the second time or after the second time, the global snoop operation can be skipped if there is a hit in the VTAGX 57-1, and the latency can be shortened. Thus, the preceding registration requesting unit 65-1 is effective when an access is made to reusable data for the second time or after the second time, but is not effective when an access is made for the first time.

In view of this, the information processing apparatus 1 of this embodiment includes the preceding registration requesting unit 65-1, and, when the address information to be registered is registered in the VTAGX 57-1, the preceding registration requesting unit 65-1 utilizes the continuity of memory accesses in accordance with the program, and registers in preceding the address information present several Kbytes ahead of the registered address information into the VTAGX 57-1.

Next, a preceding registration operation to be performed with the use of the preceding registration requesting unit 65-1 is described in detail.

In a case where there is not a hit in any of the cache memories provided in the information processing apparatus 1 in response to an access request from a CPU as a result of a global snoop control operation, and an access is determined to be made to the local memory in its local node in response to the CPU, the preceding registration requesting unit 65-1 first generates preceding address information by adding a predetermined amount (several Kbytes, for example) to the target address information corresponding to the access request at all the system controllers provided in the information processing apparatus 1. Here, all the system controllers are the system controllers (not illustrated) provided for the respective system boards SB0 to SB15. For convenience, the system controller 50-1 provided for the system board SB0 is described here as a representative one of all the system controllers provided in the information processing apparatus 1. In a case where the target address information corresponding to the access request is successfully registered in the VTAGX 57-1, the preceding registration requesting unit 65-1 generates the preceding address information that is the address information predicted to be accessed after the target address information. The preceding registration requesting unit 65-1 includes a request port (the preceding registration requesting port; not illustrated) that sequentially accumulates (stores) the generated preceding address information.

When the request port is available, the preceding registration requesting unit 65-1 sets the generated preceding address information into the request port. If effective preceding address information (a preceding registration request) is present in the preceding address information accumulated in the request port, the preceding registration requesting unit 65-1 sequentially inputs the effective preceding address information to the request port unit 61-1. Here, the effective preceding address information indicates that the primary data corresponding to the preceding address information is present in the main memories 30 and 31 of the local node. Accordingly, if the primary data corresponding to the preceding address information exists in the main memories 30 and 31 of the local node, the preceding registration requesting unit 65-1 causes the preceding address information to take part in the request selecting operation for the global snoop control, together with a memory access request broadcast from the other node.

After that, the pipeline unit 63-1 performs the global snoop control operation for the preceding address information selected by the request selecting unit 62-1. More specifically, the pipeline unit 63-1 determines whether the cache data corresponding to the preceding address information is present in one of the cache memories of nodes other than the local node in the information processing apparatus 1. If the result of the global snoop control performed for the preceding address information indicates that there is not a hit (there is a cache miss) at the cache TAGs of all the nodes provided in the information processing apparatus 1, the pipeline unit 63-1 registers the preceding address information in the VTAGX 57-1 in the local node. If the result of the global snoop control performed for the preceding address information indicates that there is a hit at one of the cache TAGs of the nodes provided in the information processing apparatus 1, the pipeline unit 63-1 does not register the preceding address information in the VTAGX 57-1, and ends the operation.

Accordingly, in a case where the result of the global snoop control performed for the preceding address information generated by the preceding registration requesting unit 65-1 indicates that the primary data corresponding to the preceding address information is present in the main memories 30 and 31 of the local node, and the cache data corresponding to the preceding address information is not present in any of the cache memories of nodes other than the local node in the information processing apparatus 1, the pipeline unit 63-1 registers the preceding address information in the VTAGX 57-1 in the local node, and causes the VTAGX 57-1 to hold the preceding address information.

The memory access issuing unit 56-1 executes a memory access request for the main memories 30 and 31 in the local node, based on an operation in response to a memory access request determined by the local snoop control unit 55-1 or the global snoop control unit 54-1.

The cache TAG 52-2, the VTAGX 57-2, the request transmission/reception unit 51-2, the local snoop control unit 55-2, the broadcast control unit 53-2, the global snoop control unit 54-2, and the memory access issuing unit 56-2 provided in the system controller 50-2 are the same as the cache TAG 52-1, the VTAGX 57-1, the request transmission/reception unit 51-1, the local snoop control unit 55-1, the broadcast control unit 53-1, the global snoop control unit 54-1, and the memory access issuing unit 56-1 of the system controller 50-1, respectively, except that the communication control operations are to be performed with respect to the level-1 cache memories 14a to 17a, the level-2 cache memories 14b to 17b, and the main memories 32 and 33.

Figure 5:
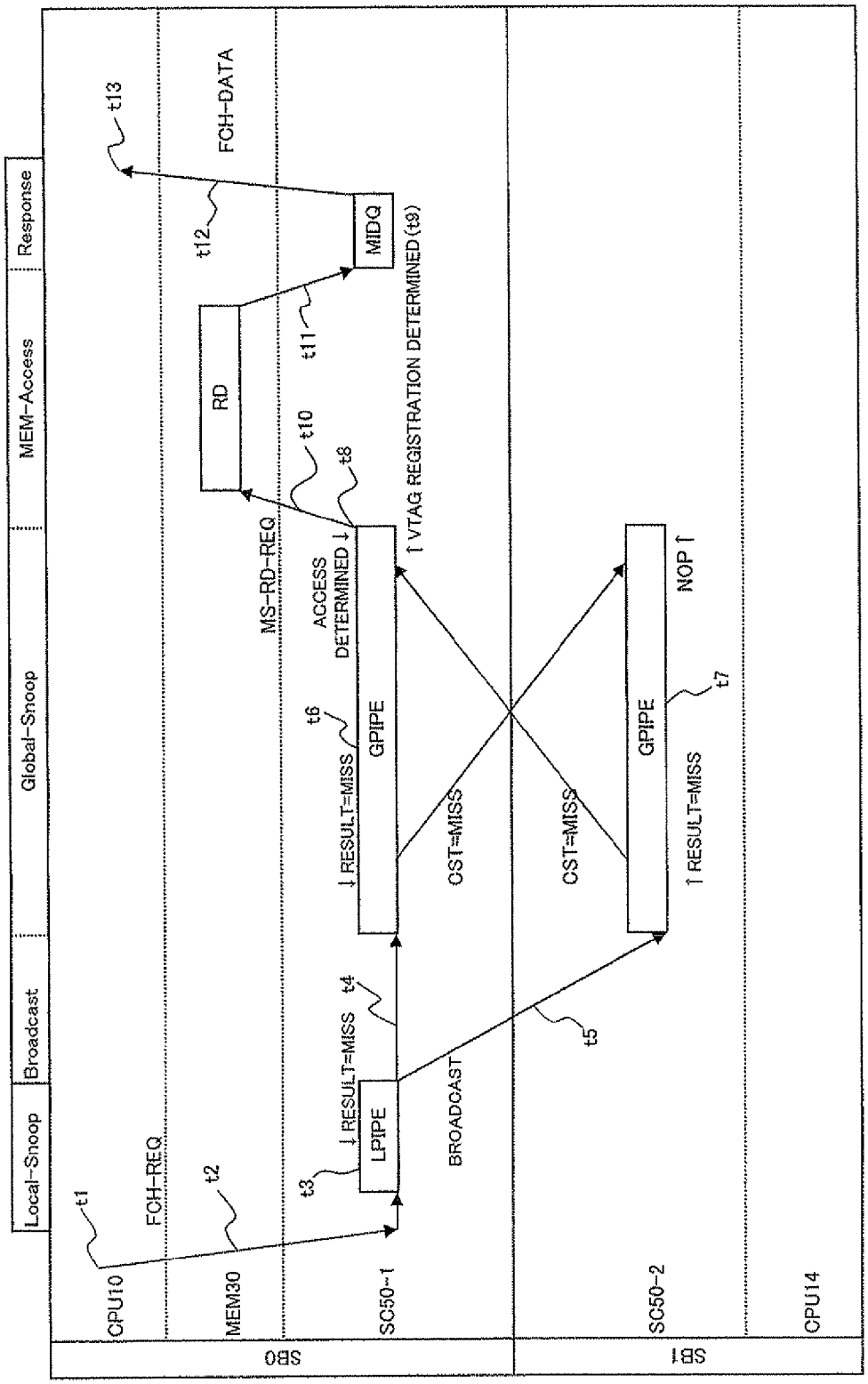
FIG. 5 is a timing chart illustrating a first example operation to be performed in the information processing apparatus as an embodiment of the present invention.

FIG. 5 is a timing chart illustrating a first example operation to be performed in the information processing apparatus 1 as an embodiment of the present invention.

The following is a description of an operation flow (the first example operation) to be performed in the information processing apparatus 1 as an embodiment of the present invention, in a case where primary data present in a main memory in the local node is to be accessed, the primary data is not cached in any of any of the cache memories provided in the information processing apparatus 1, and the address information corresponding to the primary data is not registered in the VTAGX 57-1. In FIGS. 5-10, the "LPIPE" indicates processing by the local snoop control unit, whereas the "GPIPE" indicates processing by the global snoop control unit.

As illustrated in FIG. 5, a memory access request (a data fetch request (illustrated as "FCH-REQ" in FIG. 5) in this example; hereinafter referred to as the fetch request) is first issued from the CPU 10 (see t1), and the request transmission/reception unit 51-1 receives the fetch request from the CPU 10 (see t2; the memory access request receiving step). The local snoop control unit 55-1 then searches the cache TAG 52-1 in the local node and the VTAGX 57-1 in the local node for the target address information of the fetch request (see t3: the access step).

If the result of the search conducted in response to the memory access request indicates a miss in both the cache TAG 52-1 and the VTAGX 57-1 in the local node (indicated as "result=MISS" in FIG. 5), the local snoop control unit 55-1 cancels the local snoop control, and transmits a global snoop request to the request transmission/reception unit 51-1. When receiving the global snoop request from the local snoop control unit 55-1 via the request transmission/reception unit 51-1 (the global snoop request receiving step), the broadcast control unit 53-1 transmits the global snoop request to the global snoop control unit 54-1 (see t4), and broadcasts the global snoop request to the system controllers of all nodes other than the local node in the information processing apparatus 1 (see t5).

When receiving the global snoop request from the broadcast control unit 53-1, the global snoop control unit 54-1 of the local node searches the cache TAG 52-1 in the local node for the target address information corresponding to the target data of the global snoop request (see t6). Meanwhile, when the global snoop control unit 54-2 of the other node receives the global snoop request from the broadcast control unit 53-1, the global snoop control unit 54-2 searches the cache TAG 52-2 in the other node for the target address information corresponding to the target data of the global snoop request (see t7). The global snoop control units 54-1 and 54-2 of the respective nodes exchange the results of the cache TAG searches with each other, and combine the results so as to merge the cache statuses. Based on the result of the cache status merging, the global snoop control unit 54-1 determines the final operation in response to the fetch request (see t8; the global snoop control step).

If the target data of the fetch request is not detected in any of the cache memories, and the global snoop control unit 54-1 determines that the primary data corresponding to the target data of the fetch request is to be read from the main memory 30, the global snoop control unit 54-1 also determines the registration in the VTAGX 57-1, and registers the address information corresponding to the primary data in the VTAGX 57-1 (see t9; the specific information registration step). Also, the memory access issuing unit 56-1 issues a read request (indicated as "MS-RD-REQ" in FIG. 5) with respect to the fetch request, to the main memory 30 (see t10). The primary data corresponding to the fetch request is then read from the main memory 30 into the system controller 50-1 (indicated as "RD→MIDQ"; see t11 in FIG. 5). After that, the memory access issuing unit 56-1 transmits the primary data read from the main memory 30 as a fetch data response (indicated as "FCH-DATA" in FIG. 5) to the CPU 10 (see t12), and the execution of the fetch request is completed (see t13).

Figure 6:
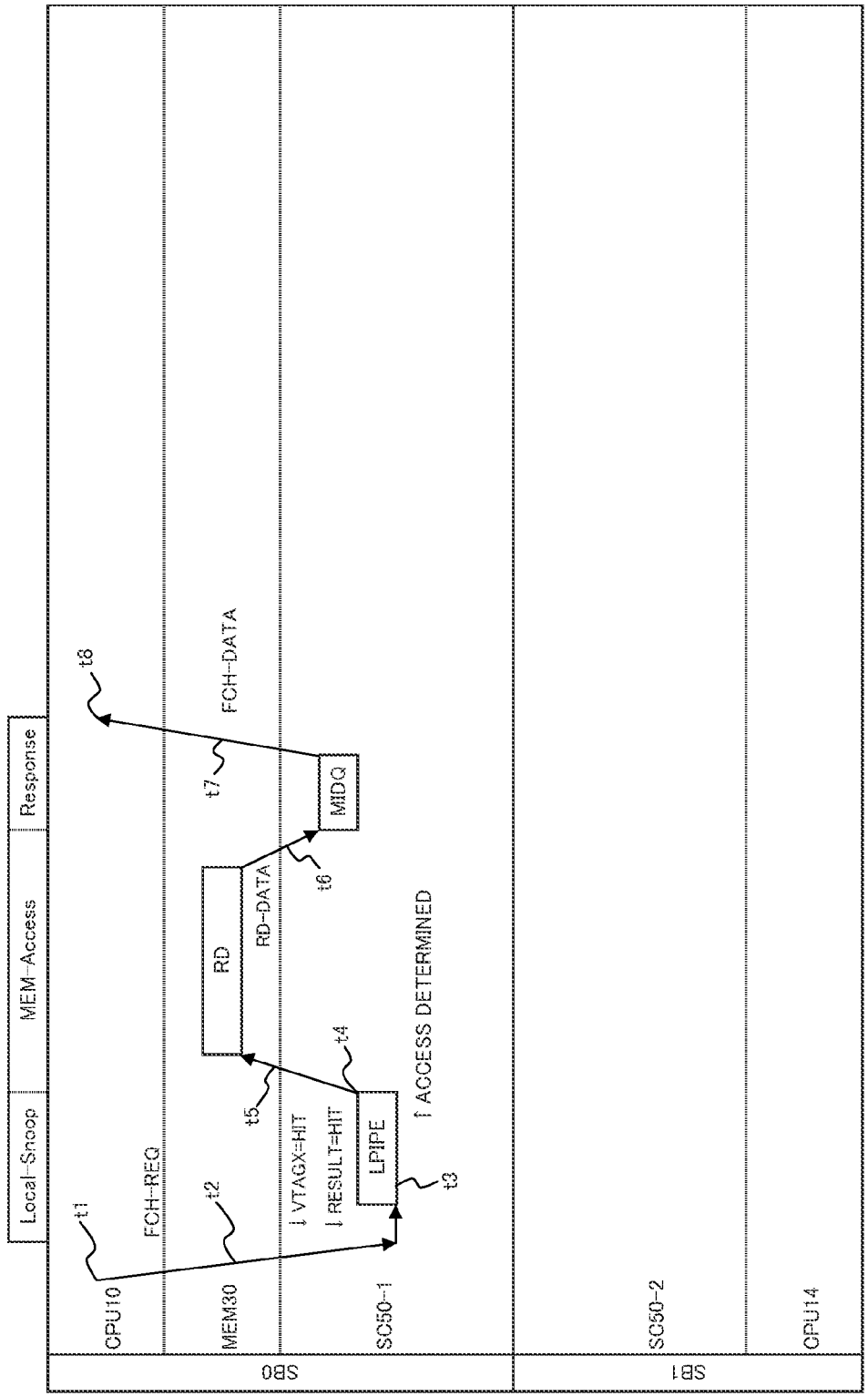
FIG. 6 is a timing chart illustrating a second example operation to be performed in the information processing apparatus as an embodiment of the present invention.

FIG. 6 is a timing chart illustrating a second example operation to be performed in the information processing apparatus 1 as an embodiment of the present invention.

The following is a description of an operation flow (the second example operation) to be performed in the information processing apparatus 1 as an embodiment of the present invention, in a case where primary data present in a main memory in the local node is to be accessed, and the address information corresponding to the primary data is registered in the VTAGX 57-1.

As illustrated in FIG. 6, a fetch request is first issued from the CPU 10 (see t1), and the request transmission/reception unit 51-1 receives the fetch request from the CPU 10 (see t2; the memory access request receiving step). The local snoop control unit 55-1 then searches the cache TAG 52-1 in the local node and the VTAGX 57-1 in the local node for the target address information of the fetch request (see t3: the access step).

If the result of the search conducted in response to the memory access request indicates a miss in the cache TAG 52-1 in the local node but a hit in the VTAGX 57-1 in the local node (indicated as "VTAGX=HIT" and "result=HIT" in FIG. 6), the local snoop control unit 55-1 determines the final operation in response to the fetch request, based on the search result (see t4; the local snoop control step). Accordingly, the global snoop control operation is omitted.

If it becomes clear that the target data of the fetch request is not present in any of the cache memories in the local node, and the local snoop control unit 55-1 determines that the primary data corresponding to the target data of the fetch request is to be read from the main memory 30, the memory access issuing unit 56-1 issues a read request with respect to the fetch request, to the main memory 30 (see t5). The primary data corresponding to the fetch request is then read from the main memory 30 into the system controller 50-1 (indicated as "RD→DATA"; see t6 in FIG. 6). After that, the memory access issuing unit 56-1 transmits the primary data read from the main memory 30 as a fetch data response (indicated as "FCH-DATA" in FIG. 6) to the CPU 10 (see t7), and the execution of the fetch request is completed (see t8).

Figure 7:
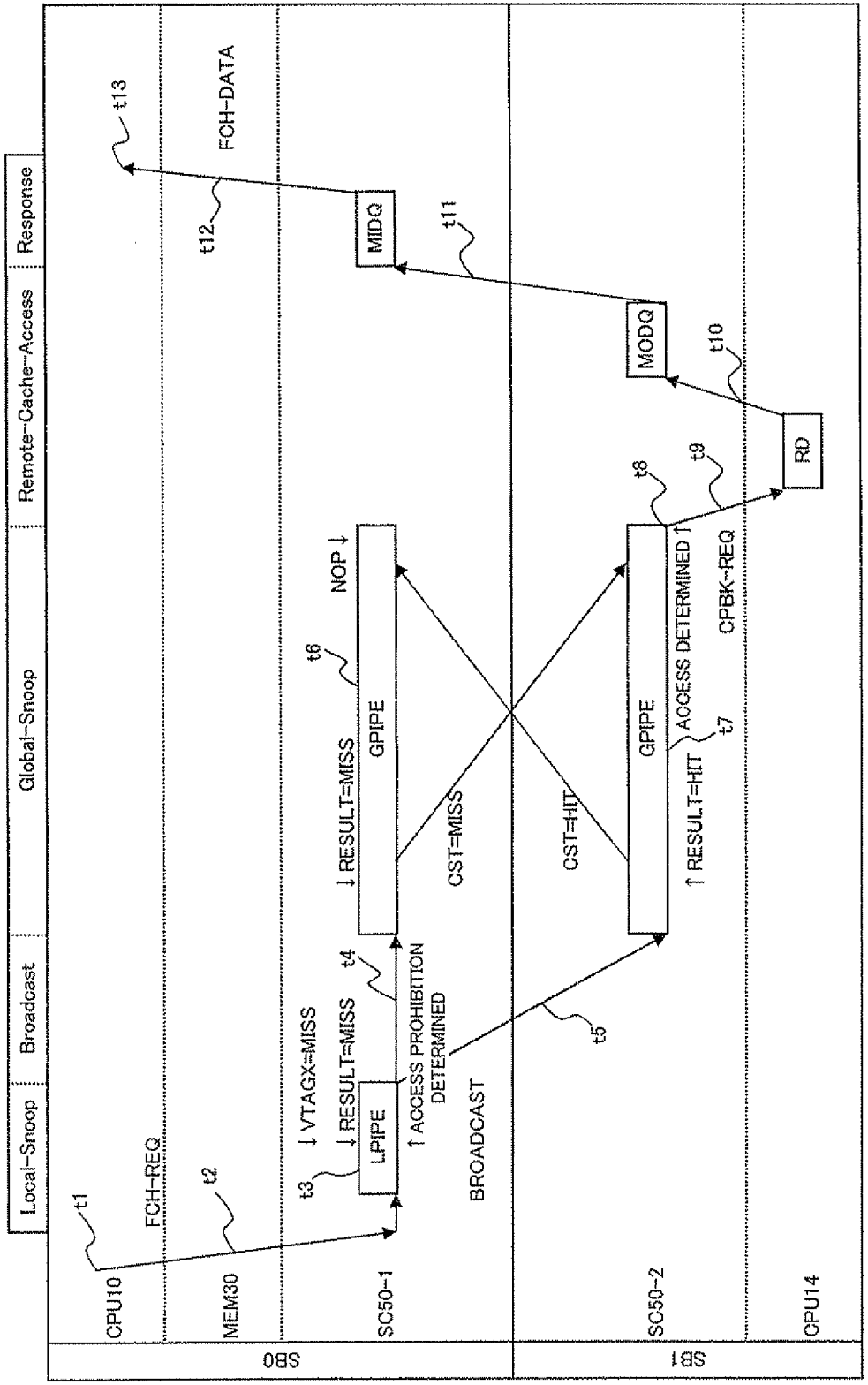
FIG. 7 is a timing chart illustrating a third example operation to be performed in the information processing apparatus as an embodiment of the present invention.

FIG. 7 is a timing chart illustrating a third example operation to be performed in the information processing apparatus 1 as an embodiment of the present invention.

The following is a description of an operation flow (the third example operation) to be performed in the information processing apparatus 1 as an embodiment of the present invention, in a case where primary data present in a main memory in the local node is to be accessed, and the cache data corresponding to the primary data is present in a cache memory of one of nodes other than the local node in the information processing apparatus 1, though the address information corresponding to the primary data is not registered in the VTAGX 57-1.

As illustrated in FIG. 7, a fetch request is first issued from the CPU 10 (see t1), and the request transmission/reception unit 51-1 receives the fetch request from the CPU 10 (see t2; the memory access request receiving step). The local snoop control unit 55-1 then searches the cache TAG 52-1 in the local node and the VTAGX 57-1 in the local node for the target address information of the fetch request (see t3: the access step).

If the result of the search conducted in response to the memory access request indicates a miss in both the cache TAG 52-1 and the VTAGX 57-1 in the local node (indicated as "VTAGX=MISS" and "result=MISS" in FIG. 7), the local snoop control unit 55-1 cancels the local snoop control, and transmits a global snoop request to the request transmission/reception unit 51-1. When receiving the global snoop request from the local snoop control unit 55-1 via the request transmission/reception unit 51-1 (the global snoop request receiving step), the broadcast control unit 53-1 transmits the global snoop request to the global snoop control unit 55-1 (see t4), and broadcasts the global snoop request to the system controllers of the other node (see t5).

When receiving the global snoop request from the broadcast control unit 53-1, the global snoop control unit 54-1 of the local node searches the cache TAG 52-1 in the local node for the target address information corresponding to the target data of the global snoop request (see t6). Meanwhile, when the global snoop control unit 54-2 of the other node receives the global snoop request from the broadcast control unit 53-1, the global snoop control unit 54-2 searches the cache TAG 52-2 in the other node for the target address information corresponding to the target data of the global snoop request (see t7). The global snoop control units 54-1 and 54-2 of the respective nodes exchange the results of the cache TAG searches with each other, and combine the results so as to merge the cache statuses. Based on the result of the cache status merging, the global snoop control unit 54-1 determines the final operation in response to the fetch request (see t8; the global snoop control step).

If it becomes clear that the target data of the fetch request is present in the level-1 cache memory 14*a* in the CPU 14 in the other node (the system board SB1 in this example), and the global snoop control unit 54-1 determines that the cache data corresponding to the target data of the fetch request is to be read from the level-1 cache memory 14*a*, the global snoop control unit 54-2 issues a read request with respect to the fetch request, to the CPU 14 including the level-1 cache memory 14*a* (see t9). The cache data corresponding to the fetch request is then read from the level-1 cache memory 14*a* (the CPU 14) into the system controller 50-2 (indicated as "MODQ"; see t10 in FIG. 7). The cache data corresponding to the fetch request is further read from the system controller 50-2 into the system controller 50-1 (indicated as "MIDQ"; see t11 in FIG. 7). After that, the global snoop control unit 54-1 transmits the cache data read from the level-1 cache memory 14*a* as a fetch data response (indicated as "FCH-DATA" in FIG. 7) to the CPU 10 (see t12), and the execution of the fetch request is completed (see t13).

Figure 8:
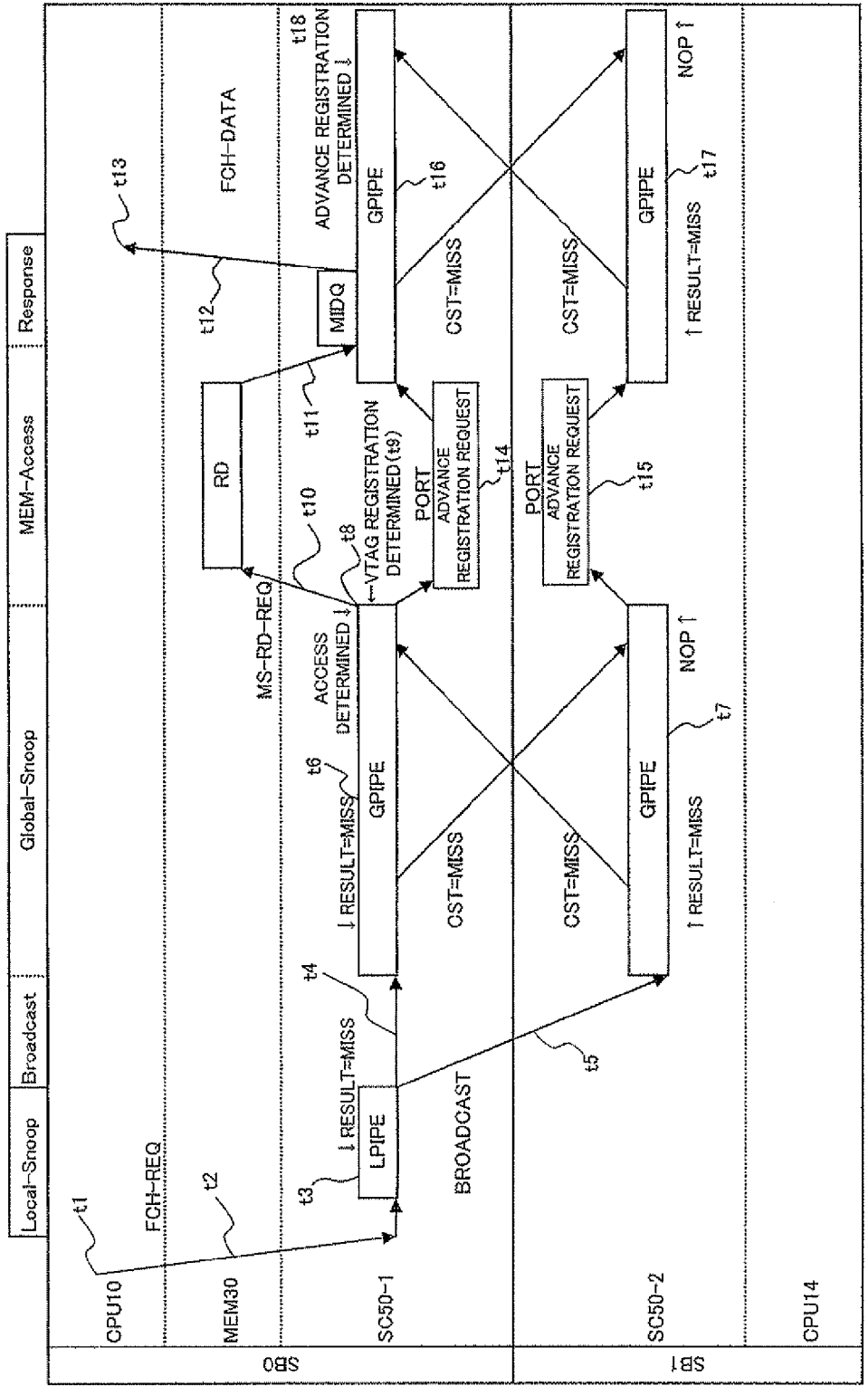
FIG. 8 is a timing chart illustrating a fourth example operation to be performed in the information processing apparatus as an embodiment of the present invention.

FIG. 8 is a timing chart illustrating a fourth example operation to be performed in the information processing apparatus 1 as an embodiment of the present invention.

The following is a description of an operation flow (the fourth example operation) to be performed in the information processing apparatus 1 as an embodiment of the present invention, in a case where a preceding registration is successfully made in the VTAGX 57-1.

The procedures at t1 to t13 are the same as those in the first example operation described with reference to FIG. 5, and therefore, explanation of them is omitted here.

As illustrated in FIG. 8, when the global snoop control unit 54-1 determines a registration in the VTAGX 57-1 (the specific information registration step), the preceding registration requesting unit 65-1 starts a preceding registration request (see t9). By adding several Kbytes to the target address information corresponding to the access request, the preceding registration requesting unit 65-1 generates preceding address information (see t14; the extended specific information generating step). Like the preceding registration requesting unit 65-1, all the other preceding registration requesting units (of the system controller 50-2 provided in the system board SB1 in this example) provided in the information processing apparatus 1 generate preceding address information by adding several Kbytes to the target address information corresponding to the access request (see t15; the extended specific information generating step).

Each of the global snoop control units then performs a global snoop control operation on the preceding address information generated by the preceding registration requesting unit 65-1 (see t16 and t17). More specifically, the global snoop control unit 54-1 of the local node searches the cache TAG 52-1 in the local node for the preceding address information generated by the preceding registration requesting unit 65-1 (see t16). Meanwhile, the global snoop control unit 54-2 of the other node searches the cache TAG 52-2 in the other node for the same preceding address information as the preceding address information searched in the local node (see t17). The global snoop control units 54-1 and 54-2 of the respective nodes exchange the results of the cache TAG searches with each other, and combine the results so as to merge the cache statuses. Based on the result of the cache status merging, the global snoop control unit 54-1 determines whether to register the preceding address information in the VTAGX 57-1 in the local node (see t18; the extended specific information registration step).

If the result of the global snoop control performed for the preceding address information indicates a miss in all the cache TAGs, the global snoop control unit 54-1 registers the preceding address information in the VTAGX 57-1 in the local node, and the execution of the preceding registration request is completed.

Figure 9:
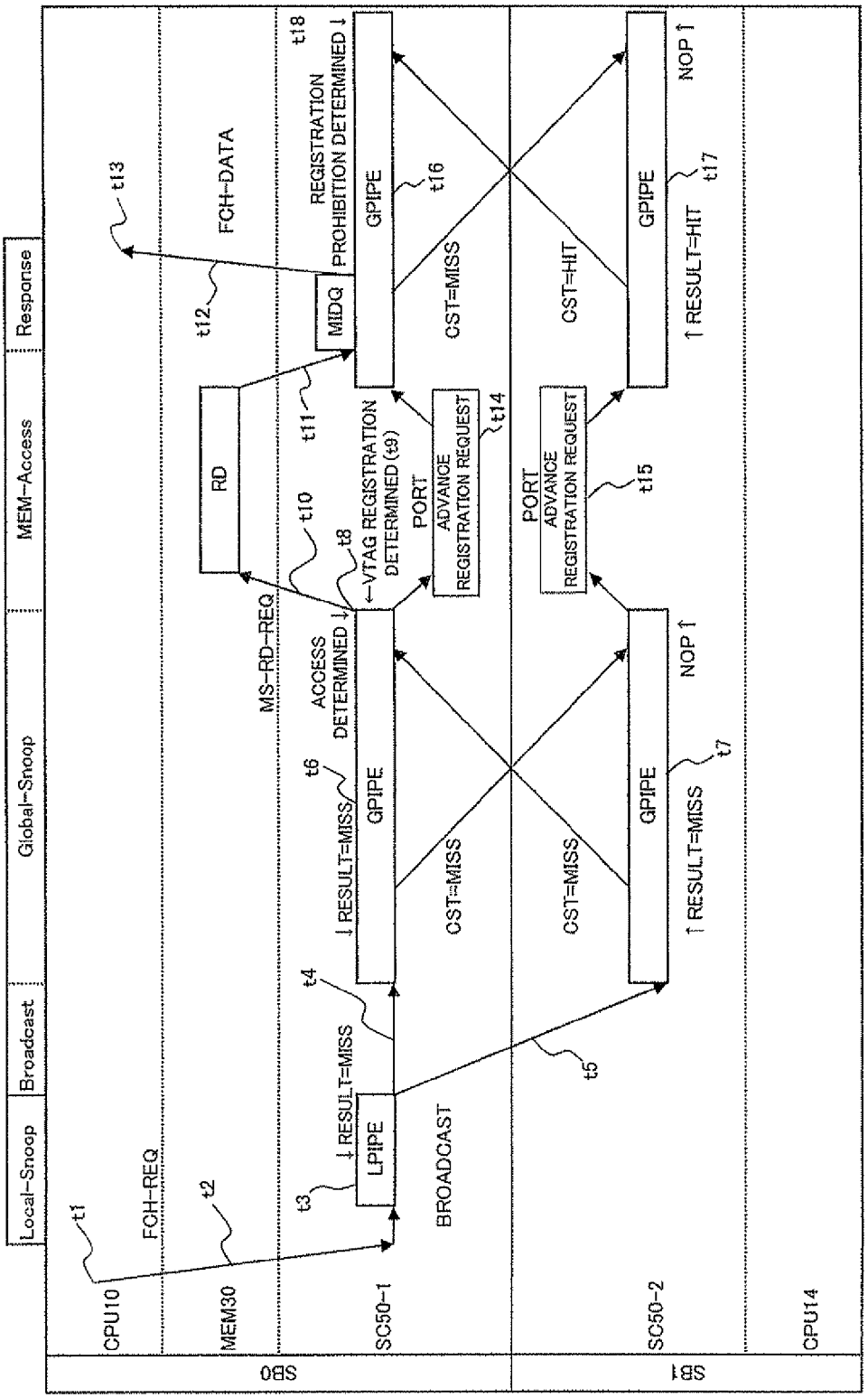
FIG. 9 is a timing chart illustrating a fifth example operation to be performed in the information processing apparatus as an embodiment of the present invention.

FIG. 9 is a timing chart illustrating a fifth example operation to be performed in the information processing apparatus 1 as an embodiment of the present invention.

The following is a description of an operation flow (the fifth example operation) to be performed in the information processing apparatus 1 as an embodiment of the present invention, in a case where a preceding registration in the VTAGX 57-1 failed.

The procedures at t1 to t17 are the same as those in the first example operation described with reference to FIG. 8, and therefore, explanation of them is omitted here.

As illustrated in FIG. 9, based on the result of the cache status merging, the global snoop control unit 54-1 determines whether to register the preceding address information in the VTAGX 57-1 in the local node (see t18).

If the result of the global snoop control performed for the preceding address information indicates a hit in one of the cache TAGs, the global snoop control unit 54-1 does not register the preceding address information in the VTAGX 57-1 in the local node, and the execution of the preceding registration request is completed.

Figure 10:
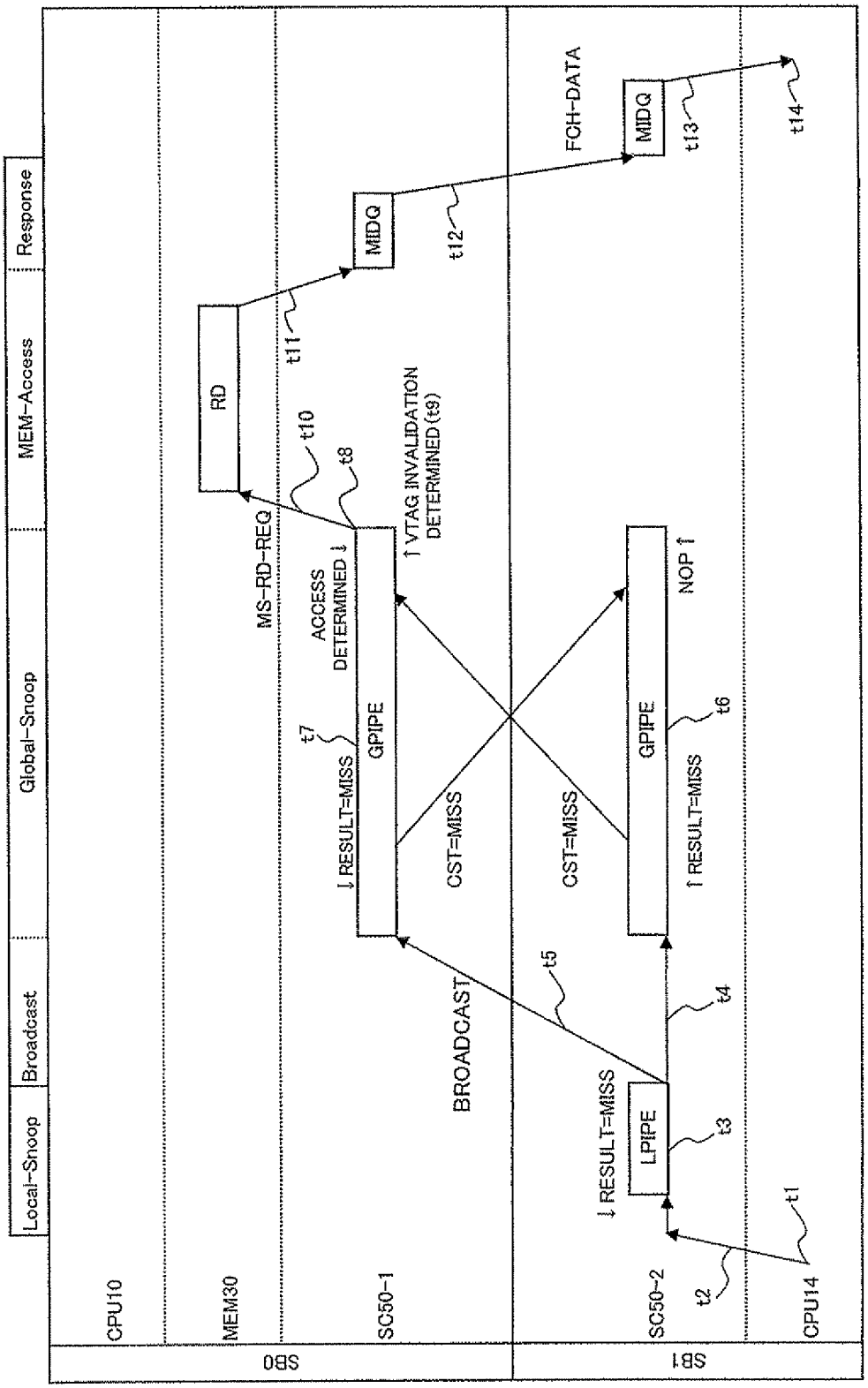
FIG. 10 is a timing chart illustrating a sixth example operation to be performed in the information processing apparatus as an embodiment of the present invention.
Figure 12:
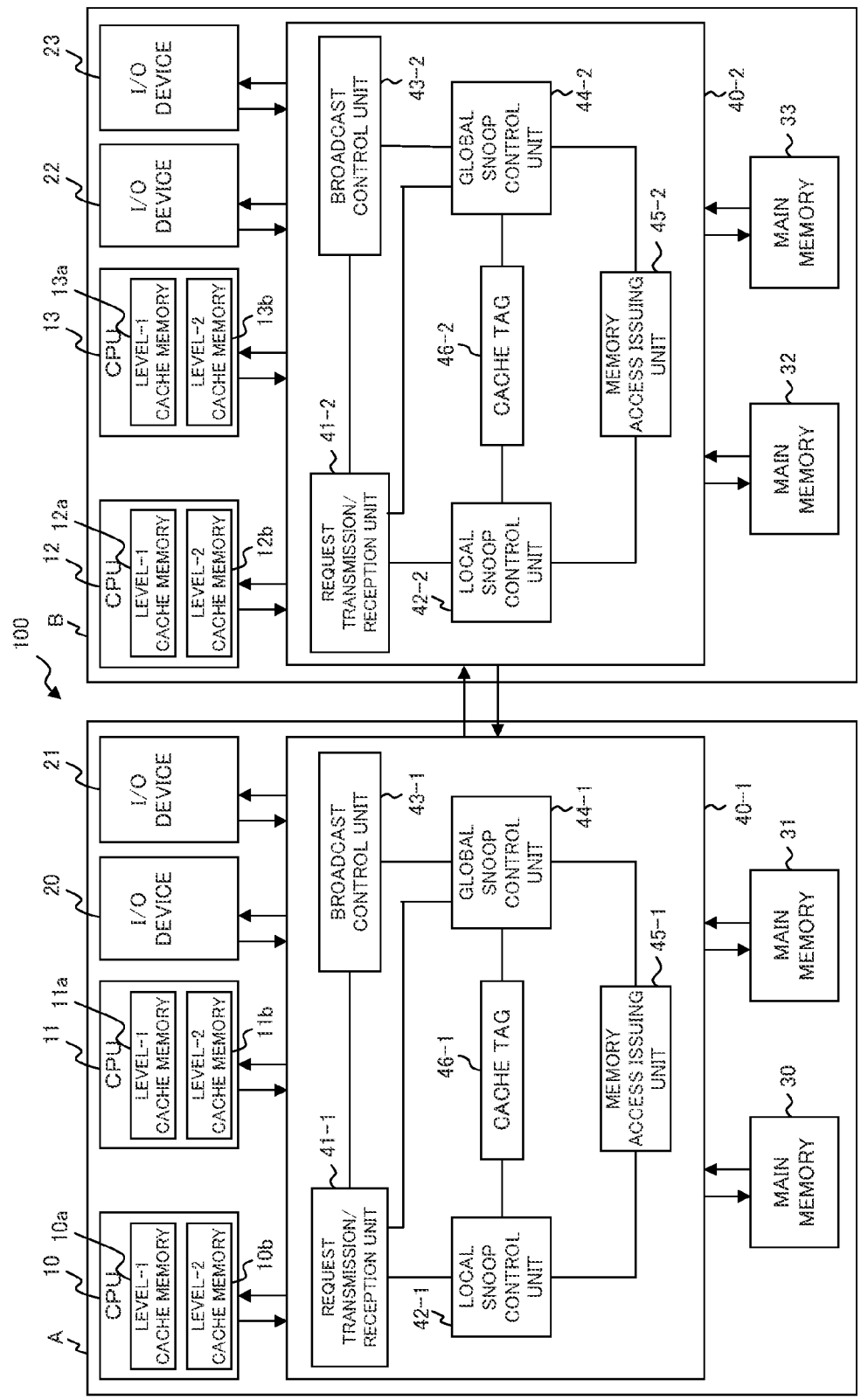
FIG. 12 is a block diagram illustrating the structure of a conventional large-scale information processing apparatus.
Figure 13:
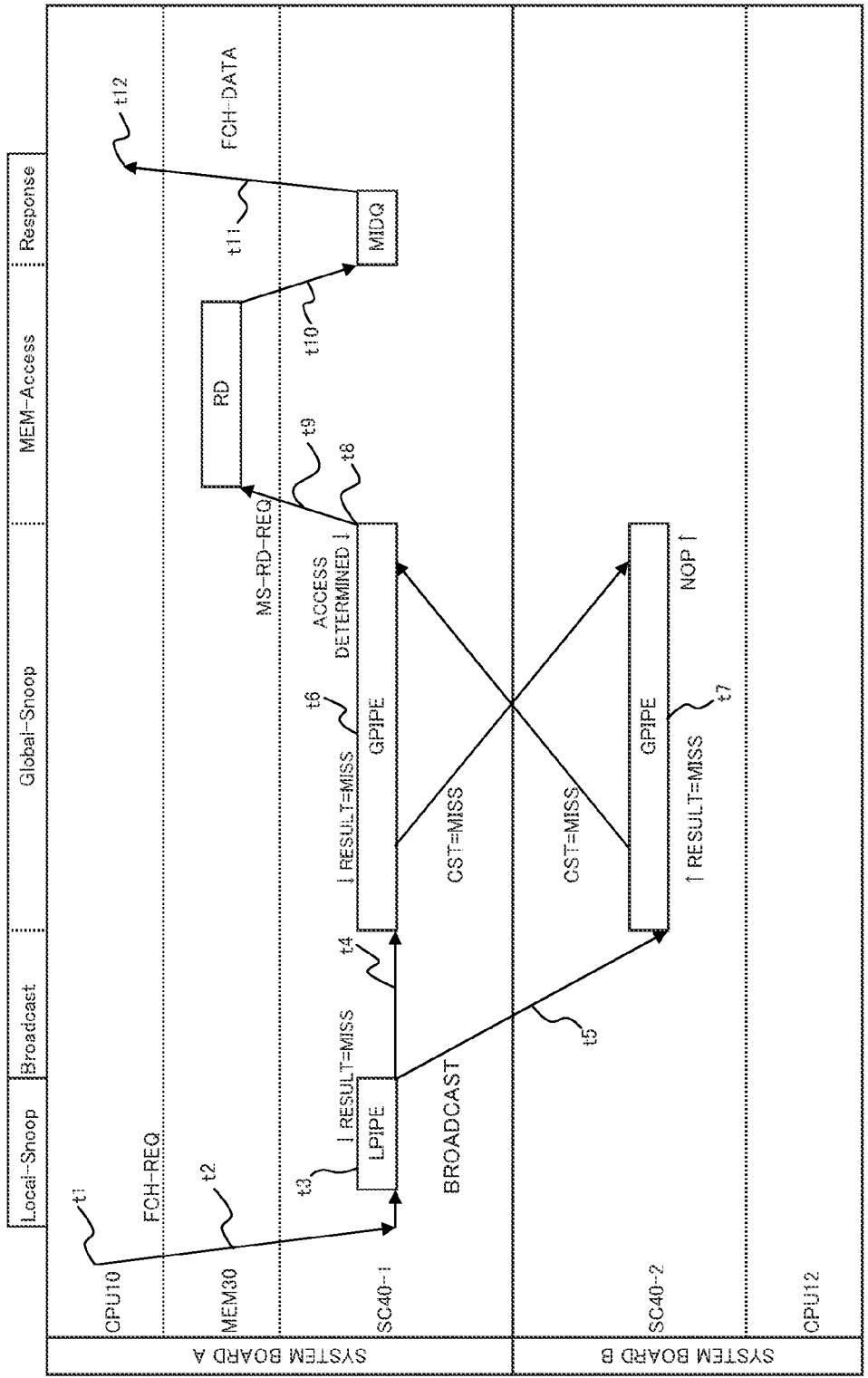
FIG. 13 is a timing chart illustrating an operation to be performed in the conventional large-scale information processing apparatus.
Figure 14:
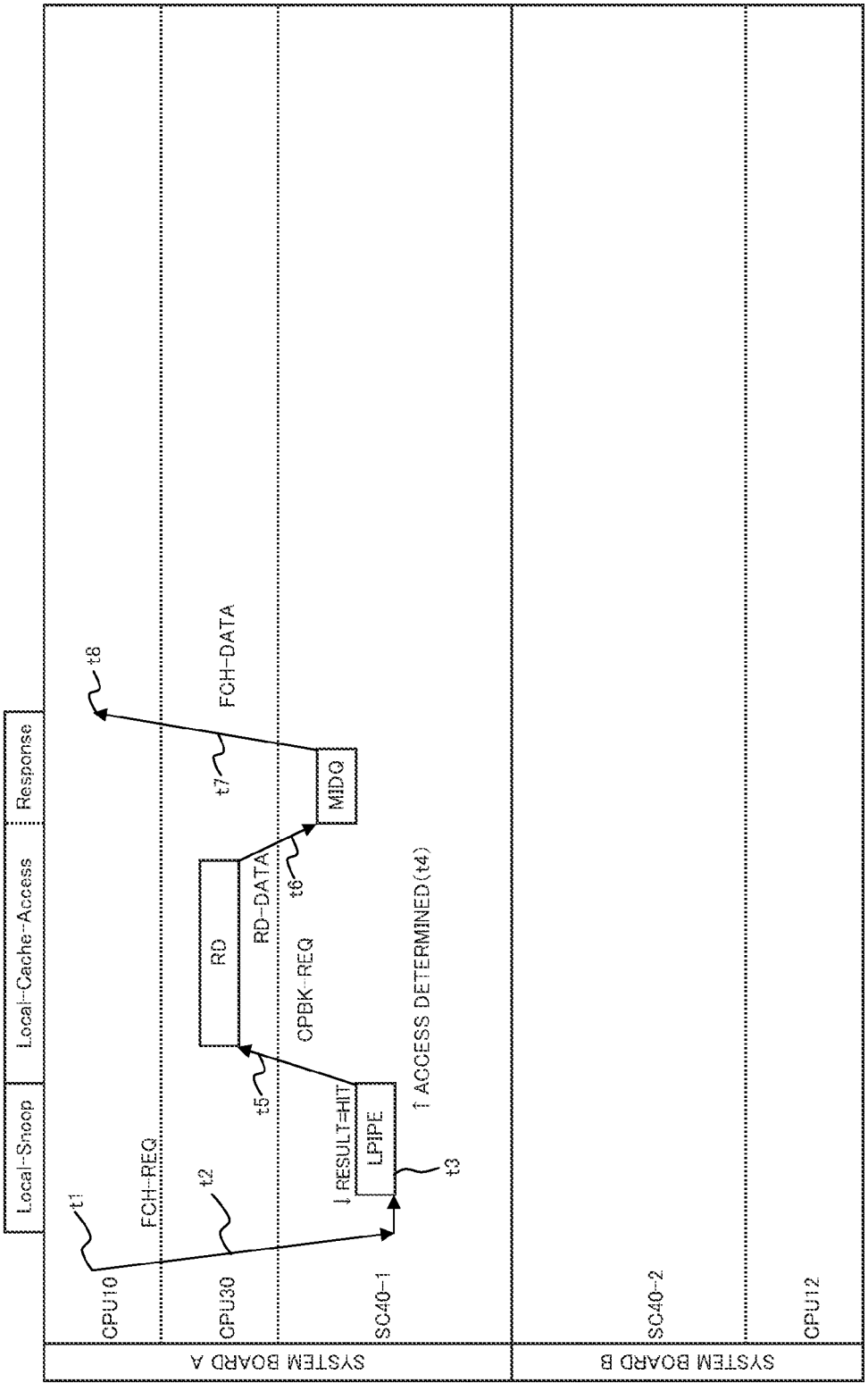
FIG. 14 is a timing chart illustrating an operation to be performed in the conventional large-scale information processing apparatus.

FIG. 10 is a timing chart illustrating a sixth example operation to be performed in the information processing apparatus 1 as an embodiment of the present invention.

The following is a description of an operation flow (the sixth example operation) to be performed in the information processing apparatus 1 as an embodiment of the present invention, in a case where address information registered in the VTAGX 57-1 is to be put into an invalid state.

As illustrated in FIG. 10, a fetch request is first issued from the CPU 14 in the other node (the system board SB1 in this example) (see t1), and the request transmission/reception unit 51-2 in the other node receives the fetch request from the CPU 14 in the other node (see t2). The local snoop control unit 55-2 in the other node then searches the cache TAG 52-2 in the other node and the VTAGX 57-2 in the other node for the target address information of the fetch request (see t3).

If the result of the search conducted in response to the memory access request indicates a miss in both the cache TAG 52-2 and the VTAGX 57-2 in the other node (indicated as "result=MISS" in FIG. 10), the local snoop control unit 55-2 in the other node cancels the local snoop control, and transmits a global snoop request to the request transmission/reception unit 51-2 in the other node. When receiving the global snoop request from the local snoop control unit 55-2 in the other node via the request transmission/reception unit 51-2 in the other node, the broadcast control unit 53-2 in the other node transmits the global snoop request to the global snoop control unit 55-2 in the other node (see t4). At the same time, the broadcast control unit 53-2 in the other node broadcasts the global snoop request to all the system controllers other than the system controller 50-2 in the information processing apparatus 1 (see t5). In this example, all the system controllers other than the system controller 50-2 in the information processing apparatus 1 are represented by the system controller 50-1 in the local node.

When receiving the global snoop request from the broadcast control unit 53-2, the global snoop control unit 54-2 in the other node searches the cache TAG 52-2 in the other node for the target address information corresponding to the target data of the global snoop request (see t6). Meanwhile, when the global snoop control unit 54-1 in the local node receives the global snoop request from the broadcast control unit 53-2 in the other node, the global snoop control unit 54-1 searches the cache TAG 52-1 in the local node for the target address information corresponding to the target data of the global snoop request (see t7). The global snoop control units 54-1 and 54-2 of the respective nodes exchange the results of the cache TAG searches with each other, and combine the results so as to merge the cache statuses. Based on the result of the cache status merging, the global snoop control unit 54-1 determines the final operation in response to the fetch request (see t8).

If the target data of the fetch request is not detected in any of the cache memories, and the global snoop control unit 54-1 determines that the primary data corresponding to the target data of the fetch request is to be read from the main memory 30 in the local node, the global snoop control unit 54-1 in the local node changes the valid bit corresponding to the address information stored in the VTAGX 57-1 from a valid state to an invalid state. In this manner, the global snoop control unit 54-1 in the local node invalidates the address information in the VTAGX 57-1 (see t9; the invalidation step). Also, the memory access issuing unit 56-1 of the local node issues a read request (indicated as "MS-RD-REQ" in FIG. 10) with respect to the fetch request, to the main memory 30 (see t10). The primary data corresponding to the fetch request is then read from the main memory 30 into the system controller 50-1 in the local node (see t11). The primary data corresponding to the fetch request is further read from the system controller 50-1 in the local node into the system controller 50-2 in the other node (indicated as "MIDQ"; see t12 in FIG. 10). After that, the memory access issuing unit 56-2 in the other node transmits the primary data read from the main memory 30 in the local node as a fetch data response (indicated as "FCH-DATA" in FIG. 10) to the CPU 14 (see t13), and the execution of the fetch request is completed (see t14).

FIG. 11 is a table for explaining the conditions in which a global snoop control operation is canceled in the information processing apparatus 1 as an embodiment of the present invention.

As described above, in the information processing apparatus 1 as an embodiment of the present invention, the local snoop control unit 55-1 skips the global snoop control operation, and activates an access to a main memory in the local node in the following cases (1) to (6) (see the remarks denoted by "circles" in FIG. 11).

(1) Where the issued memory access request is a command fetch request, and the target data of the command fetch request is found as a shared type (a shared fetch request to simply fetch the target data from one of the cache memories provided in the information processing apparatus 1) in the cache TAG 52-1 in the local node (see section "1.3" in FIG. 11).

(2) Where the issued memory access request is a command fetch request, and the target data of the command fetch request is found as an exclusive type (an exclusive-type fetch command to cause only one cache memory to store the target data among all the cache memories provided in the information processing apparatus 1) in the cache TAG 52-1 in the local node (see section "1.4" in FIG. 11).

(3) Where the issued memory access request is a shared-type (load) fetch request, and the target data of the shared-type fetch request is found as a shared type in the cache TAG 52-1 in the local node (see section "2.3" in FIG. 11).

(4) Where the issued memory access request is a shared-type fetch request, and the target data of the shared-type fetch request is found as an exclusive type in the cache TAG 52-1 in the local node (see section "2.4" in FIG. 11).

(5) Where the issued memory access request is an exclusive-type (store) fetch request, and the target data of the exclusive-type fetch request is found as an exclusive type in the cache TAG 52-1 in the local node (see section "3.5" in FIG. 11).

(6) Where the issued memory access request is a block store request, and the target data of the block store request is found as an exclusive type in the cache TAG 52-1 in the local node (see section "4.5" in FIG. 11).

In the information processing apparatus 1 as an embodiment of the present invention, the local snoop control unit 55-1 can skip the global snoop control operation, and activate an access to a main memory in the local node in the following cases (7) to (12) (see the remarks denoted by "double circles" in FIG. 11), as well as the cases (1) to (6).

(7) Where the issued memory access request is a command fetch request, and the target data of the command fetch request is not found in the cache TAG 52-1 in the local node, but is found in the VTAGX 57-1 in the local node (see section "1.2" in FIG. 11).

(8) Where the issued memory access request is a shared-type (load) fetch request, and the target data of the shared-type fetch request is not found in the cache TAG 52-1 in the local node, but is found in the VTAGX 57-1 in the local node (see section "2.2" in FIG. 11).

(9) Where the issued memory access request is an exclusive-type (store) fetch request, and the target data of the exclusive-type fetch request is not found in the cache TAG 52-1 in the local node, but is found in the VTAGX 57-1 in the local node (see section "3.2" in FIG. 11).

(10) Where the issued memory access request is an exclusive-type (store) fetch request, and the target data of the exclusive-type fetch request is found as a shared type in the cache TAG 52-1 in the local node, and is also found in the VTAGX 57-1 in the local node (see section "3.4" in FIG. 11). In this case, the address information corresponding to the target data and is registered in the VTAGX 57-1 is put into an invalid state.

(11) Where the issued memory access request is a block store request, and the target data of the block store request is not found in the cache TAG 52-1 in the local node, but is found in the VTAGX 57-1 in the local node (see section "4.2" in FIG. 11).

(12) Where the issued memory access request is a block store request, and the target data of the block store request is found as a shared type in the cache TAG 52-1 in the local node, and is also found in the VTAGX 57-1 in the local node (see section "4.4" in FIG. 11). In this case, the address information corresponding to the target data and is registered in the VTAGX 57-1 is put into an invalid state.

In the cases other than the cases (1) to (12), the global snoop control unit 54-1 performs the global snoop control operation (see FIG. 11).

Although the operations to be performed by the system controller 50-1 according to the local snoop control method (the operation to be performed in the information processing apparatus 1) as an embodiment of the present invention have been described so far, the operations to be performed by the system controllers in the respective system boards SB1 to SB15 in a case where a memory access request is issued from a CPU or an I/O device in the system boards SB1 to SB15 other than the system board SB0 are the same as the above operations to be performed by the system controller 50-1.

As described above, according to the local snoop control method in the information processing apparatus 1 as an embodiment of the present invention, the VTAGX 57-1 having a larger capacity than the capacity of the cache memory in the local node is added to each of the nodes provided in the information processing apparatus 1, and the search of the VTAGX 57-1 is added to the operation of the local snoop control unit 55-1, so as to virtually expand the cache memory space in the local node. Accordingly, even if there is a miss in the cache TAG 52-1 in the local node, an access to the target data in the main memories 30 and 31 in the local node can be activated by performing a local snoop control operation as a low-latency data communication, as long as there is a hit in the VTAGX 57-1. In this manner, the global snoop control over the nodes in the information processing apparatus 1 can be skipped, and still, cache coherency among all the nodes in the information processing apparatus 1 can be guaranteed. Thus, the conditions under which the global snoop control operation is skipped can be made wider. Accordingly, the latency of each memory access in the large-scale information processing apparatus 1 can be shortened, and the throughput in each snoop operation can be improved. Further, it is possible to improve the busy ratio between the broadcast bus and the global snoop operation in the large-scale information processing apparatus 1. As a result, the information processing apparatus 1 can achieve higher performances.

In a case where an exclusive-type memory access request that involves invalidation of cache data is issued from the CPUs 10 to 13 in the local node, and the target data of the memory access request is found or not found as a shared type in the cache TAG 52-1, the operation to invalidate the cache data present in the cache memories in the other nodes becomes unnecessary, if the target data of the memory access request is found in the VTAGX 57-1. Accordingly, the global snoop control operation over the nodes in the information processing apparatus 1 is skipped in this case, and an access is made to a main memory in the local node. Also, an operation to invalidate the cache data present in a cache memory in the local node can be activated.

Further, when the VTAGX 57-1 is provided in the system controller 50-1, there is no need to make a noticeable control change in the system controller 50-1 of a present large-scale SMP information processing apparatus. Accordingly, the VTAGX 57-1 can be easily provided in a present large-scale SMP information processing apparatus.

In a case where the target address information corresponding to the target data of a memory access request is registered in the VTAGX 57-1, preceding address information several Kbytes ahead of the target address information is registered in preceding in the VTAGX 57-1 under certain conditions, with the continuity of memory accesses according to the program being used. Accordingly, even if an access from the CPUs 10 to 13 in the local node is a first-time access, the VTAGX 57-1 can be searched. In this manner, even if an access from the CPUs 10 to 13 in the local node is a first-time access, the global snoop control operation can be skipped, and cache coherency among all the nodes in the information processing apparatus 1 can be guaranteed, as long as there is a hit in the VTAGX 57-1. Thus, the latency of each memory access in the large-scale information processing apparatus 1 can be shortened, and the throughput of each snoop operation can be improved.

[2] Other Embodiments

The present invention is not limited to the above embodiments, and various changes and modifications may be made to them without departing from the scope of the invention.

For example, a VTAGX is provided in each of the nodes in the information processing apparatus 1 in the above embodiment. However, the present invention is not limited to that structure, and a VTAGX may be provided in one or some of the nodes in the information processing apparatus 1.

Also, address information is used as specific information in the above embodiment. However, it is also possible to use any information as specific information by which primary data or cache data can be specified.

Further, a valid bit is used as the state information in the above embodiment. However, it is also possible to use any information indicating whether the subject specific information is in an invalid state or a valid state.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus comprising:
a plurality of nodes, each comprising a main memory, a processor having a cache memory, and a controller that guarantees cache coherency among the nodes,
each controller comprising:
a first storage that stores address information corresponding to primary data that is present in the main memory of a local node and is cached in the local node;
a second storage that stores the address information corresponding to the primary data if the primary data is not cached in any of the nodes other than the local node;
a local snoop control unit that performs a local snoop control operation to guarantee cache coherency at the local node, when a memory access request is generated at the local node, and target data of the memory access request corresponds to the address information stored in at least one of the first and second storages;
a global snoop control unit that performs a global snoop control operation to guarantee cache coherency among the nodes; and
a request transmission/reception unit that broadcasts a memory access request to the local snoop control unit in response to receiving the memory access request generated at the local node, and broadcasts a global snoop request requesting to perform the global snoop control operation to the global snoop control unit in response to receiving the global snoop request from the local snoop control unit, wherein
when the target data of the memory access request corresponds to the address information stored in neither the first storage nor the second storage, the local snoop control unit transmits the global snoop request to the request transmission/reception unit.

2. The information processing apparatus according to claim 1, wherein, when a memory access request is issued at one of the nodes other than the local node, if target data of that memory access request is the primary data corresponding to the address information stored in the second storage, the global snoop control unit invalidates the address information corresponding to the primary data present in the main memory of the local node and stored in the second storage, whereby an operation as a response to the memory access request issued at the one of the nodes other than the local node is determined.

3. The information processing apparatus according to claim 1, wherein the global snoop control unit causes the second storage to store the address information corresponding to the primary data present in the main memory of the local node, when a result of the performing the global snoop control operation indicates that the primary data is not cached in any of the nodes other than the local node.

4. The information processing apparatus according to claim 3, wherein
the controller including the second storage further includes an extended address information generating unit that generates extended address information that differs from the address information stored in the second storage; and
the global snoop control unit causes the second storage to store the extended address information, when a result of the global snoop control operation performed on the extended address information generated by the extended address information generating unit indicates that primary data corresponding to the extended address information is present in the main memory of the local node, and further indicates that the primary data corresponding to the extended address information is not cached in any of the nodes other than the local node.

5. The information processing apparatus according to claim 1, wherein the address information stored in the second storage has a data size that can be read by the processor in the local node in one operation.

6. The information processing apparatus according to claim 5, wherein the second storage stores an address information group as the address information, the address information group being a plurality of sequential addresses.

7. The information processing apparatus according to claim 6, wherein the second storage stores state information for each address in the address information group, the state information indicating whether an associated address is valid or invalid.

8. A memory control method in a controller comprising first and second storages for an information processing apparatus comprising a plurality of nodes, each of the nodes comprising a main memory, a processor having a cache memory, and a controller that guarantees cache coherency among the nodes,
each memory control method comprising:
receiving a memory access request generated at a local node that is one of the nodes;

accessing the first storage when the memory access request is received, the first storage storing address information corresponding to primary data present in the main memory of the local node and being cached in the local node;

accessing the second storage when the memory access request is received, the second storage storing address information corresponding to primary data present in the main memory of the local node, and not being cached in any of the nodes other than the local node;

performing a local snoop control operation to guarantee cache coherency at the local node, when target data of the received memory access request corresponds to the address information stored in at least one of the first and second storages;

receiving a global snoop request to request a global snoop control operation to guarantee cache coherency among the nodes, when the target data of the memory access request corresponds to the address information stored in neither the first storage nor the second storage when performing the local snoop control operation; and performing the global snoop control operation, when the global snoop request is received.

9. The memory control method according to claim 8, further comprising:

invalidating, when a memory access request is issued at one of the nodes other than the local node, if target data of the memory access request is the primary data corresponding to the address information stored in the second storage, the address information corresponding to the primary data present in the main memory of the local node and stored in the second storage, whereby an operation as a response to the memory access request is determined.

10. The memory control method according to claim 8, further comprising:

causing the second storage to store the address information corresponding to the primary data present in the main memory of the local node, when a result of the global snoop control operation indicates that the primary data is not cached in any of the nodes other than the local node.

11. The memory control method according to claim 10, further comprising:

generating extended address information that differs from the address information stored in the second storage; and causing the second storage to store the extended address information, when a result of the global snoop control operation performed on the extended address information indicates that primary data corresponding to the extended address information is present in the main memory of the local node, and further indicates that the primary data corresponding to the extended address information is not cached in any of the nodes other than the local node.

12. A memory control device comprising: a main memory, a processor having a cache memory, and a controller that guarantees cache coherency between the memory control device and second memory control devices, the controller comprising:

a first storage that stores address information corresponding to primary data that is present in the main memory of the memory control device and is cached in the memory control device;

a second storage that stores the address information corresponding to the primary data if the primary data is not cached in any of the second memory control devices;

a local snoop control unit that performs a local snoop control operation to guarantee cache coherency in the memory control device, when a memory access request is generated in the memory control device, and target data of the memory access request corresponds to the address information stored in at least one of the first and second storages;

a global snoop control unit that performs a global snoop control operation to guarantee cache coherency between the memory control device and the second memory control devices; and a request transmission/reception unit that broadcasts a memory access request to the local snoop control unit in response to receiving the memory access request generated in the memory control device, and broadcasts a global snoop request requesting to perform the global snoop control operation to the global snoop control unit in response to receiving the global snoop request from the local snoop control unit requesting the global snoop control operation, wherein when the target data of the memory access request corresponds to the address information stored in neither the first storage nor the second storage, the local snoop control unit transmits the global snoop request to the request transmission/reception unit.

13. The memory control device according to claim 12, wherein the global snoop control unit causes the second storage to store the address information corresponding to the primary data present in the main memory of the memory control device, when a result of the global snoop control operation indicates that the primary data is not cached in any of the second memory control devices.

14. The memory control device according to claim 13, wherein the controller further includes an extended address information generating unit that generates extended address information that differs from the address information stored in the second storage; and the global snoop control unit causes the second storage to store the extended address information, when a result of the global snoop control operation performed on the extended address information generated by the extended address information generating unit indicates that primary data corresponding to the extended address information is present in the main memory of the memory control device, and further indicates that the primary data corresponding to the extended address information is not cached in any of the second memory control devices.

* * * * *